(12) United States Patent
Gueth et al.

(10) Patent No.: US 11,574,444 B1
(45) Date of Patent: Feb. 7, 2023

(54) MULTI-CHARACTERISTIC REMESHING FOR GRAPHICAL OBJECTS

(71) Applicant: Adobe Inc., San Jose, CA (US)

(72) Inventors: Pierre Gueth, Lyons (FR); Tamy Boubekeur, Paris (FR); Jeremie Dumas, Seattle, WA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 17/520,478

(22) Filed: Nov. 5, 2021

(51) Int. Cl.
*G06T 17/20* (2006.01)
*G06T 17/10* (2006.01)
*G06T 15/00* (2011.01)

(52) U.S. Cl.
CPC ............ *G06T 17/205* (2013.01); *G06T 15/00* (2013.01); *G06T 17/10* (2013.01)

(58) Field of Classification Search
CPC ....... G06T 17/205; G06T 17/10; G06T 15/00; G06T 19/00–20
See application file for complete search history.

(56) References Cited

U.S. PATENT DOCUMENTS

| | | | |
|---|---|---|---|
| 2010/0031197 A1* | 2/2010 | Paugam | G06F 9/451 715/853 |
| 2018/0336723 A1* | 11/2018 | Elmer | G06F 30/23 |
| 2022/0239719 A1* | 7/2022 | Gül | H04N 21/2187 |

OTHER PUBLICATIONS

Chytracek, Radovan, et al. "Geometry description markup language for physics simulation and analysis applications." IEEE Transactions on Nuclear Science 53.5 (2006): 2892-2896. (Year: 2006).*

Ahmed et al., A Simple Push-Pull Algorithm for Blue-Noise Sampling, IEEE Transactions on Visualization and Computer Graphics, vol. 23, No. 12 Available Online at: https://ieeexplore.ieee.org/stamp/stamp.jsp?tp=&arnumber=7790842, Dec. 2017, pp. 2496-2508.

(Continued)

*Primary Examiner* — Daniel F Hajnik
(74) *Attorney, Agent, or Firm* — Kilpatrick Townsend & Stockton LLP

(57) ABSTRACT

A multi-characteristic remeshing system that generates remeshed 3D graphical surfaces can include a compact geometric descriptive language ("CGDL") conversion module, one or more geometric characteristic parsing modules, and a geometric computation module. The CGDL conversion module receives an input mesh for a 3D graphical object and CGDL source text that describes target characteristics of an output mesh of the 3D graphical object. Each geometric characteristic parsing module identifies inherent geometric characteristics of the input mesh, and generates a geometric characteristic map. The geometric characteristic map includes instructions to generate the output mesh with respective target characteristics. The instruction describes a relationship of the one or more inherent geometric characteristics with the respective target characteristic. The geometric computation module generates the output mesh with the target characteristics, based on the geometric characteristic maps from the geometric characteristic parsing modules.

20 Claims, 7 Drawing Sheets

(56) References Cited

OTHER PUBLICATIONS

Balzer et al., Capacity-Constrained Point Distributions: A Variant of Lloyd's Method, ACM Transactions on Graphics, vol. 28, No. 3, Available Online at: https://dl.acm.org/doi/pdf/10.1145/1531326.1531392, Aug. 2009, pp. 1-8.

Boissonnat et al., Triangulations in CGAL, Symposium on Computational Geometry, Available Online at: https://dl.acm.org/doi/pdf/10.1145/336154.336165, May 2000, pp. 11-18.

Cignoni et al., Metro: Measuring Error on Simplified Surfaces, Computer Graphics Forum, vol. 17, Issue 2, Jun. 1998, pp. 167-174.

De Goes et al., Blue Noise Through Optimal Transport, ACM Transactions on Graphics, vol. 33, No. 6, Article 171, Available Online at: https://dl.acm.org/doi/pdf/10.1145/2366145.2366190, Nov. 2012, pp. 1-11.

Dobrzynski et al., MMG3D: User Guide, https://www.mmgtools.org, 2012.

Dunyach et al., Adaptive Remeshing for Real-Time Mesh Deformation, Eurographics Short Papers, Available Online at: http://diglib.eg.org/bitstream/handle/10.2312/conf.EG2013.short.029-032/029-032.pdf?sequence=1&isAllowed=y, May 2013, pp. 29-32.

Garland et al., Surface Simplification Using Quadric Error Metrics, Conference on Computer Graphics and Interactive Techniques, Available Online at: https://dl.acm.org/doi/pdf/10.1145/258734.258849, Aug. 3, 1997, 8 pages.

Guennebaud et al., Eigen V3, Available Online at: https://eigen.tuxfamily.org, 2010.

Jakob et al., Enoki: Structured Vectorization and Differentiation on Modern Processor Architectures, Available Online at: https://github.com/mitsuba-renderer/enoki, 2019.

Jakob et al., Instant Field-Aligned Meshes, ACM Transactions on Graphics, vol. 34, No. 6, Article No. 189, Available Online at: https://dl.acm.org/doi/pdf/10.1145/2816795.2818078, Nov. 2015, pp. 1-15.

Jiang et al., Blue Noise Sampling Using an SPH-Based Method, ACM Transactions on Graphics, vol. 34, No. 6, Article No. 211, Available Online at: https://dl.acm.org/doi/pdf/10.1145/2816795.2818102, Nov. 2015, pp. 1-11.

Lachaud et al., Interpolated Corrected Curvature Measures for Polygonal Surfaces, Computer Graphics Forum, vol. 39, No. 5, Jul. 2020, pp. 41-54.

Levy, Geogram, Available Online at: http://alice.loria.fr/software/geogram/doc/html/index.html, 2014.

Levy et al., Variational Anisotropic Surface Meshing with Voronoi Parallel Linear Enumeration, International Meshing Roundtable, Oct. 2013, pp. 349-366.

Liu et al., On Centroidal Voronoi Tessellation—Energy Smoothness and Fast Computation, Transactions on Graphics, vol. 28, No. 4, Article No. 101, Available Online at: https://dl.acm.org/doi/pdf/10.1145/1559755.1559758, Aug. 2009, pp. 1-17.

Nivoliers et al., Anisotropic and Feature Sensitive Triangular Remeshing Using Normal Lifting, Journal of Computational and Applied Mathematics, vol. 289, Dec. 2015, pp. 225-240.

Remeshing, https://instalod.zendesk.com/hc/en-us/articles/360016273779-Remeshing, Sep. 21, 2021, pp. 1-5.

Remeshing CGAL 5, https://doc.cgal.org/latest/Polygon_mesh_processing/index.html, Sep. 21, 2021, pp. 1-30.

Remeshing Simplygon, https://documentation.simplygon.com/SimplygonSDK_8.3.37100.0/articles/starthere/featurelist/remeshing.html, Sep. 21, 2021, pp. 1-6.

Rycroft, Voro++: A Three-Dimensional Voronoi Cell Library in C++, Lawrence Berkeley National Laboratory, Available Online at: https://www.osti.gov/servlets/purl/946741, Jan. 15, 2009, pp. 1-14.

Sainlot et al., Restricting Voronoi Diagrams to Meshes Using Corner Validation, Computer Graphics Forum, vol. 36, No. 5, Available Online at: https://hal.archives-ouvertes.fr/hal-01626140/file/corner-validated-rvd.pdf, Aug. 2017, pp. 1-11.

Shapira et al., Consistent Mesh Partitioning and Skeletonisation Using the Shape Diameter Function, The Visual Computer, vol. 24, No. 4, Jan. 8, 2008, pp. 249-259.

Sheffer et al., Seamster: Inconspicuous Low-Distortion Texture Seam Layout, Visualization, Available Online at: https://ieeexplore.ieee.org/stamp/stamp.jsp?tp=&arnumber=1183787, Oct. 27-Nov. 1, 2002, pp. 291-298.

Singh et al., Analysis of Sample Correlations for Monte Carlo Rendering, Computer Graphics Forum, State-Of-The-Art Report, vol. 38, No. 2, Available Online at: https://kops.uni-konstanz.de/bitstream/handle/123456789/46366/Singh_2-1mlhgc4j4u776.pdf;jsessionid=C4278EF931F1F908BDC2B5606D781497?sequence=1, May 2019, pp. 473-491.

Stadlbauer et al., Interactive Modeling of Cellular Structures on Surfaces with Application to Additive Manufacturing, Computer Graphics Forum, vol. 39, No. 2, Available Online at: https://onlinelibrary.wiley.com/doi/epdf/10.1111/cgf.13929, May 2020, pp. 277-289.

Trettner et al., Fast and Robust QEF Minimization Using Probabilistic Quadrics, Computer Graphics Forum, vol. 39, No. 2, May 2020, 10 pages.

Valette et al., Generic Remeshing of 3D Triangular Meshes with Metric-Dependent Discrete Voronoi Diagrams, IEEE Transactions on Visualization and Computer Graphics, vol. 14, No. 2, Available Online at: https://ieeexplore.ieee.org/stamp/stamp.jsp?tp=&arnumber=4359499, Mar.-Apr. 2008, pp. 369-381.

Wu et al., Fast Mesh Decimation by Multiple-Choice Techniques, Symposium on Vision, Modeling, Visualization, Available Online at: https://www.graphics.rwth-aachen.de/media/papers/mcd_vmv021.pdf, Nov. 20-22, 2002, 8 pages.

Xin et al., Centroidal Power Diagrams with Capacity Constraints: Computation, Applications, and Extension, ACM Transactions on Graphics, vol. 35, No. 6, Article No. 244, Available Online at: https://dl.acm.org/doi/pdf/10.1145/2980179.2982428, Nov. 2016, pp. 1-12.

Yan et al., Isotropic Remeshing With Fast and Exact Computation of Restricted Voronoi Diagram, Computer Graphics Forum, vol. 28, No. 5, Available Online at: https://citeseerx.ist.psu.edu/viewdoc/download?doi=10.1.1.306.5508&rep=rep1&type=pdf, Jul. 2009, pp. 1445-1454.

Yuksel, Sample Elimination for Generating Poisson Disk Sample Sets, Computer Graphics Forum, vol. 34, No. 2, Available Online at: https://core.ac.uk/download/pdf/189678027.pdf, May 2015, 8 pages.

Zayer et al., Layered Fields for Natural Tessellations on Surfaces, ACM Transactions on Graphics, vol. 37, No. 6, Article No. 264, Available Online at: https://dl.acm.org/doi/pdf/10.1145/3272127.3275072, Dec. 2018, pp. 1-15.

Zhong et al., Particle-Based Anisotropic Surface Meshing, ACM Transactions on Graphics, vol. 32, No. 4, Article 99, Jul. 2013, pp. 1-14.

Zhou et al., Thingi10K: A Dataset of 10,000 3D-Printing Models, Available Online at: https://arxiv.org/pdf/1605.04797.pdf, Jul. 2, 2016, 8 pages.

\* cited by examiner

MULTI-CHARACTERISTIC REMESHING FOR GRAPHICAL OBJECTS

TECHNICAL FIELD

This disclosure relates generally to the field of three-dimensional computer graphics, and more specifically relates to efficiently modifying a geometric characteristic of a surface mesh for an object within a computer-implemented graphical environment.

BACKGROUND

A computer-implemented graphical environment may include virtual objects, which have appearances that are described by a surface mesh. In some cases, a surface mesh is a three-dimensional ("3D") triangle mesh, such as a mesh that has edges, vertices, or other data structures for describing an associated virtual object. Within the computer-implemented graphical environment, visual quality of an included virtual object may be determined based on how accurately the virtual object is described by an associated surface mesh. In addition, operational performance of the computer-implemented graphical environment may be determined based on efficient use of computing resources to generate the virtual object.

In some cases, a virtual object may be described by a surface mesh that is poorly suited for a particular computer-implemented graphical environment. For example, a virtual object with a high-quality graphical appearance may be computationally intensive, and may interfere with user activities within an example computer-implemented graphical environment. In addition, a virtual object with a lower-quality graphical appearance may be visually unpleasant to a user, or may disrupt a user's experience within the example computer-implemented graphical environment. Furthermore, a virtual object may be utilized within multiple computer-implemented graphical environments having different performance criteria, such that a surface mesh that is suitable for one environment may be inappropriate for another environment. In addition, remeshing a virtual object, such as by generating a surface mesh to describe different geometric characteristics for the virtual object, may be time-consuming and computationally expensive. For example, a person who designs virtual objects for computer-implemented graphical environments, such as a graphical designer, may utilize multiple single-purpose programs to modify a virtual object, each single-purpose program having functions to modify a particular subset of geometric characteristics for the virtual object. Computer-implemented graphical environments may benefit from multi-purpose surface remeshing techniques, which may simplify modifications for multiple geometric characteristics of a virtual object.

SUMMARY

According to certain embodiments, a multi-characteristic remeshing system generates remeshed 3D graphical surfaces. In some cases, a system comprises a compact geometric descriptive language ("CGDL") conversion module, a plurality of geometric characteristic parsing modules, and a geometric computation module. The CGDL conversion module is configured for receiving an input mesh for a 3D graphical object. The input mesh comprises edges and vertices that describe a surface of the 3D graphical object. The CGDL conversion module is also configured for receiving CGDL source text that describes target characteristics of an output mesh of the 3D graphical object. Each of the plurality of geometric characteristic parsing modules is configured for identifying one or more inherent geometric characteristics of the input mesh. In addition, each of the geometric characteristic parsing modules is configured for generating a geometric characteristic map. The geometric characteristic map describes a respective target characteristic. The geometric characteristic map includes an instruction to generate the output mesh that has the respective target characteristic. The instruction describes a relationship of the one or more inherent geometric characteristics with the respective target characteristic. In addition, each of the geometric characteristic parsing modules is configured for providing the geometric characteristic map to the geometric computation module. The geometric computation module is configured for generating the output mesh that has the target characteristics.

In some cases, a method involves receiving an input mesh for a 3D graphical object. The input mesh comprises edges and vertices that describe a surface of the 3D graphical object. The method also involves receiving compact geometric descriptive language ("CGDL") source text. The CGDL source text describes target characteristics of an output mesh of the 3D graphical object. In addition, the method involves applying a plurality of geometric characteristic parsing modules to the CGDL source text. For example, each of the geometric characteristic parsing modules identifies one or more inherent geometric characteristics of the input mesh. In addition, each parsing module of the geometric characteristic parsing modules generates a geometric characteristic map. The geometric characteristic map describes a respective target characteristic. The geometric characteristic map includes an instruction to generate the output mesh that has the respective target characteristic. The instruction describes a relationship of the one or more inherent geometric characteristics with the respective target characteristic. The geometric characteristic map is provided to a geometric computation module. The method also involves receiving, from the geometric computation module, the output mesh that has the target characteristics.

In some cases, a non-transitory computer-readable medium embodies program code that, when executed by a processor, causes the processor to perform operations. The operations comprise receiving an input mesh for a 3D graphical object. The input mesh comprises edges and vertices that describe a surface of the 3D graphical object. The operations also comprise receiving compact geometric descriptive language ("CGDL") source text. The CGDL source text describes target characteristics of an output mesh of the 3D graphical object. In addition, the operations comprise applying a plurality of geometric characteristic parsing modules to the CGDL source text. For example, each of the geometric characteristic parsing modules identifies one or more inherent geometric characteristics of the input mesh. In addition, each parsing module of the geometric characteristic parsing modules generates a geometric characteristic map. The geometric characteristic map describes a respective target characteristic. The geometric characteristic map includes an instruction to generate the output mesh that has the respective target characteristic. The instruction describes a relationship of the one or more inherent geometric characteristics with the respective target characteristic. The geometric characteristic map is provided to a geometric computation module. The operations also comprise receiving, from the geometric computation module, the output mesh that has the target characteristics.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
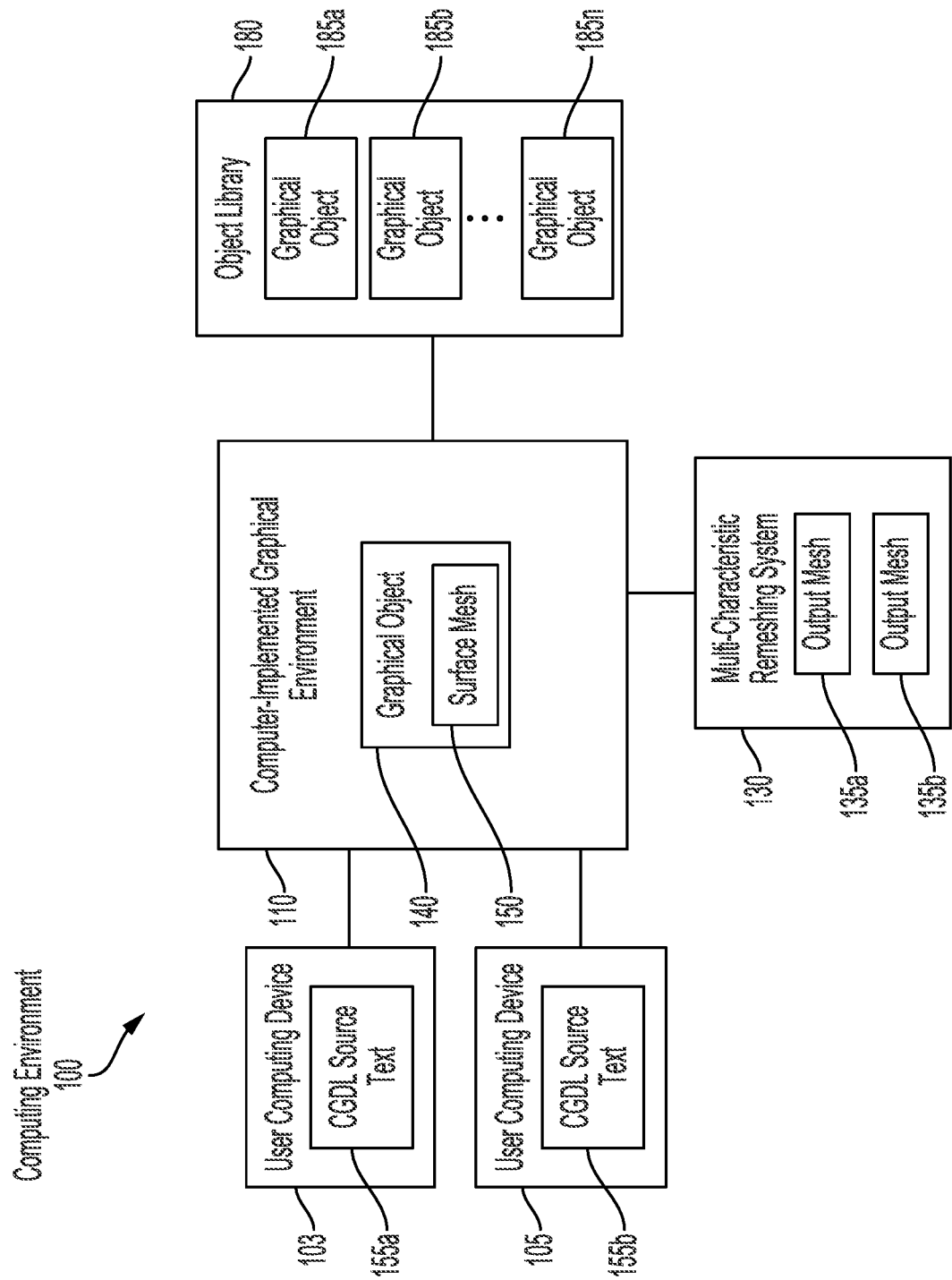
FIG. 1 is a diagram depicting an example of a computing environment in which one or more graphical objects may be remeshed, according to certain embodiments.

As discussed above, prior techniques for remeshing a virtual object do not provide tools or techniques to modify multiple geometric characteristics of the virtual object. In some cases, conflicting application-specific constraints create difficulties for a single-purpose remeshing tool to cover all use cases. In addition, use of single-purpose remeshing tools may require intricate knowledge of each single-purpose remeshing tool as well as geometric programming skills. A user of single-purpose remeshing tools, such as a graphical designer, may inefficiently spend time performing tedious maintenance and development of a virtual object for use in multiple computer-implemented graphical environments.

Certain embodiments described herein provide for a multi-characteristic remeshing system that is capable of creating a surface mesh for a virtual object. The multi-characteristic remeshing system may include multiple geometric characteristic parsing modules that are configured to create maps by which a surface mesh with particular geometric characteristics may be generated. A geometric characteristic may include one or more numeric values that describe appearance of the virtual object, such as shape, size, surface texture, locations of corners or edges, or other characteristics of the object's appearance. In some cases, each of the geometric characteristic parsing modules may generate a respective geometric characteristic map based on a statement, or set of statements, in a compact geometric descriptive language ("CGDL"). In addition, one or more geometric computation modules may interpret the geometric characteristic map to generate a surface mesh with the respective geometric characteristic. Based on the compact geometric descriptive language, the multi-characteristic remeshing system may generate multiple modifications to multiple geometric characteristics of the virtual object.

In some cases, a multi-characteristic remeshing system may generate (or receive) CGDL source text that is computationally compact and efficient. For example, a CGDL source text that describes multiple complicated geometric calculations for remeshing a virtual object may be a relatively small data object. The relatively small data object including the example CGDL source text may be stored with high efficiency, such as with relatively low use of memory computing resources. In addition, the example CGDL source text may be relatively simple to transmit, allowing high-efficiency transmission on a data bus (e.g., between graphical processing units or other computing components), across a data network (e.g., among computing systems connected to a shared graphical environment), or other suitable types of transmission. In some cases, a computing system that receives the example CGDL source text may rapidly generate the described surface mesh for the virtual object, such as remeshing calculations performed via maps created by geometric characteristic parsing modules. For example, a computing system that includes (or otherwise accesses) a local set of geometric characteristic parsing modules or geometric computation modules may rapidly perform the described geometrical calculations for remeshing a virtual object, improving remeshing performance by the computing system and potentially producing a more pleasing experience for a user interacting with the virtual object.

The following examples are provided to introduce certain embodiments of the present disclosure. In this example, a multi-characteristic remeshing system may receive a surface mesh associated with a 3D graphical object and a set of CGDL source text describing target geometric characteristics of the surface mesh. Geometric characteristic parsing modules in the multi-characteristic remeshing system, such as parsing modules for density characteristics, anisotropy characteristics, and sharpness characteristics, may parse or interpret the CGDL source text. Based on the CGDL source text, the geometric characteristic parsing modules may generate geometric characteristic maps. In some cases, the geometric characteristic maps may include evaluation structures that indicate relationships of inherent characteristics of the surface mesh to an output, such as an evaluation structure indicating target geometric characteristics for an output surface mesh. Based on the geometric characteristic maps, a geometric computation module in the multi-characteristic remeshing system may calculate an output mesh having the target geometric characteristics. In addition, the output mesh may modify an appearance of the 3D graphical object.

Certain embodiments described herein may provide improved remeshing techniques for generating an output mesh for a 3D graphical object with multiple target geometric characteristics of a surface mesh for a virtual object. For instance, interpreting CGDL source text may involve applying particular rules, such as rules of a formal grammar to generate instructions identifying relationships between mathematical representations of geometric data (e.g., vertex fields, 3D coordinate space, point clouds). Additionally or alternatively, generating a surface mesh of a virtual object based on interpreted CGDL source text involves applying additional rules, such as generating vector data structures representing the geometric data and generating the output mesh based on the vector data structures. In some cases, CGDL source text may provide a compact and computationally efficient description of a surface mesh. For example, a multi-characteristic remeshing system that receives CGDL source text may quickly and efficiently generate a surface mesh having target geometric characteristics described by the CGDL source text. In addition, target geometric characteristics described by a set of CGDL source text may be more efficiently distributed or coordinated among multiple computing systems, such as reducing network bandwidth allocated to transmitting CGDL source text (as compared to transmitting a modified virtual object). Furthermore, the multi-characteristic remeshing system may provide a surface mesh with an improved appearance as compared to a surface mesh that is output by a contemporary remeshing system. For example, generating a surface mesh based on the CGDL source text may improve consistency of modifications determined by multiple geometric computation modules included in the multi-characteristic remeshing system. These otherwise independent geometric computation modules are coordinated within the multi-characteristic remeshing system to deliver optimized generation of a surface mesh.

In an additional improved technological result, a person using CGDL source text to describe target geometric characteristics for a virtual object may identify remeshing operations with improved speed and efficiency, such as by reducing labor-intensive time and effort related to evaluating potential target geometric characteristics. By contrast, a person using contemporary remeshing tools to evaluate potential target geometric characteristics may spend more time and effort by inputting various target characteristics to multiple single-purpose remeshing tools, as compared to a person who is using a multi-characteristic remeshing system. Thus, embodiments described herein improve computer-implemented processes for remeshing virtual objects, thereby providing a more suitable solution for automating tasks previously performed by humans.

Referring now to the drawings, FIG. 1 depicts an example of a computing environment 100 in which one or more graphical objects may be remeshed. The computing environment 100 may include a computer-implemented graphical environment 110. In some cases, the graphical environment 110 may be accessible by multiple computing devices, such as a user computing device 103 or a user computing device 105. The graphical environment 110 may include a virtual environment in which graphical objects may be displayed or otherwise accessed. For example, the virtual environment may include a 3D coordinate space in which one or more graphical objects may be presented. In some cases, the graphical environment 110 may include a virtual environment in which target geometric characteristics for graphical objects may be modified, such as a software development environment suitable for creating or modifying 3D graphical objects. In addition, the graphical environment 110 may include a shared virtual environment, such as a multi-player online game.

In the example computing environment 100, the computer-implemented graphical environment 110 includes (or is configured to communicate with) a multi-characteristic remeshing system 130. In addition, the computer-implemented graphical environment 110 includes (or is configured to communicate with) an object library 180. In some cases, the object library 180 includes one or more graphical objects that may be accessed by the computer-implemented graphical environment 110. For example, the object library 180 may include a graphical object 185a, a graphical object 185b, or additional graphical objects through a graphical object 185n (collectively referred to herein as graphical objects 185). In some cases, one or more of the graphical objects 185 are 3D graphical objects.

In FIG. 1, the computer-implemented graphical environment 110 includes at least one graphical object, such as a graphical object 140. The graphical object 140 can be a 3D graphical object, such as an object that is generated using a 3D model. In addition, the graphical object 140 may be represented by a surface mesh 150. For example, the surface mesh 150 can define a shape or other appearance of the graphical object 140. In some cases, the surface mesh 150 may include a group of polygons, such as triangles, that have relationships between edges and vertices of the polygons. In addition, the group of polygons in the surface mesh 150 can describe a shape of the graphical object 140, such as a shape that is based on positions and relationships of the polygons. In some cases, the graphical object 140 is a virtual object, such as a virtual object included within a virtual environment of the computer-implemented graphical environment 110.

In the computing environment 100, one or more client devices can access the computer-implemented graphical environment 110, such as client devices including the user computing device 103 or the user computing device 105. The user computing devices 103 and 105 may include one or more of a personal computer, laptop, a personal digital assistant, a smartphone, or other personal or professional computing devices suitable for displaying a graphical object. In some cases, the user computing devices 103 or 105 may access the graphical object 140 via the computer-implemented graphical environment 110. For example, one or more of the devices 103 or 105 may display the graphical object 140 within a virtual context of the computer-implemented graphical environment 110, such as a particular graphical object that is displayed via multiple computing devices within a shared virtual environment (e.g., a multi-player online game). In addition, one or more of the devices 103 or 105 may receive the graphical object 140 (or a copy thereof) for display within a local environment of the devices 103 or 105, such as a 3D model (e.g., a model for 3D printing) that is downloaded for interaction within a local environment.

In some implementations, one or more of the user computing devices 103 or 105 may provide data that indicates a particular target characteristic for the graphical object 140. For example, the user computing device 103 may provide a first set of parameters (e.g., text data) that describe a first target geometric characteristic for the graphical object 140, such as a set of CGDL source text 155a. In addition, the user computing device 105 may provide a second set of parameters that describe a second target geometric characteristic for the graphical object 140, such as a set of CGDL source text 155b. The user computing devices 103 and 105 may respectively generate the CGDL source text 155a and 155b based on a respective desired appearance of the graphical object 140 on the devices 103 and 105. For example, the user computing device 103 may generate the CGDL source text 155a indicating a high-quality visual appearance of the graphical object 140, such as based on appearance parameters indicated via user inputs, hardware characteristics of the device 103, settings described for a virtual environment of the graphical environment 110, or other suitable data related to a graphical object displayed on the device 103. In addition, the user computing device 105 may generate the CGDL source text 155b indicating a low-quality visual appearance of the graphical object 140, such as based on data related to a graphical object displayed on the device 105.

In FIG. 1, the CGDL source text 155a and 155b are described as being generated by the user computing devices 103 and 105, but other implementations are available. For example, the multi-characteristic remeshing system 130 may generate a set of CGDL source text based on data describing parameters for a graphical object, such as data describing display settings for a user computing device, data describing interactions with a graphical object within a virtual environment, or other suitable descriptive data.

In some cases, one of the computer-implemented graphical environment 110 or the multi-characteristic remeshing system 130 receives one or more of the CGDL source text 155a or 155b. For example, each of the user computing devices 103 and 105 provide the respective CGDL source text 155a or 155b to the multi-characteristic remeshing system 130 (e.g., via a communication channel of the graphical environment 110). Each of the CGDL source text 155a and 155b may describe a respective target geometric characteristic for the graphical object 140. The respective target characteristic described by the CGDL source text 155a may be different from, similar to, or identical to the respective target characteristic described by the CGDL source text 155b.

In addition, the multi-characteristic remeshing system 130 may generate multiple surface meshes for the graphical object 140 based on one or more of the CGDL source text 155a or 155b. For example, the multi-characteristic remeshing system 130 may identify a first target geometric characteristic generated based on the CGDL source text 155a and a second target geometric characteristic generated based on the CGDL source text 155b. In some cases, the multi-characteristic remeshing system 130 generates one or more of an output mesh 135a or an output mesh 135b based on respective target geometric characteristics of the surface mesh 150. The output mesh 135a may have the first target geometric characteristic described by the CGDL source text 155a. The output mesh 135b may have the second target geometric characteristic described by the CGDL source text 155b. In some cases, an appearance of the graphical object 140 is modified by the generated output meshes 135a or 135b. For example, based on the high-quality visual appearance indicated by the CGDL source text 155a, the output mesh 135a may provide a high-quality appearance of the graphical object 140. The output mesh 135a may describe the graphical object 140 using, for example, a relatively large quantity of polygons, relatively sharp interactions of polygons at edges of the graphical object 140, or other geometric characteristics that describe a relatively high-quality appearance. In addition, based on the low-quality visual appearance indicated by the CGDL source text 155b, the output mesh 135b may provide a low-quality appearance of the graphical object 140. The output mesh 135b may describe the graphical object 140 using, for example, a relatively small quantity of polygons, relatively loose interactions of polygons at the edges of the graphical object 140, or other geometric characteristics that describe a relatively low-quality appearance.

In some implementations, the computer-implemented graphical environment 110 may associate one or more of the output meshes 135a or 135b with the graphical object 140. In some cases, the graphical environment 110 may display (or otherwise provide) the output mesh 135a to the user computing device 103. In addition, the graphical environment 110 may display (or otherwise provide) the output mesh 135b to the user computing device 105. In FIG. 1, the computer-implemented graphical environment 110 is described as providing the output meshes 135a and 135b to the devices 103 and 105, but other implementations are possible. For example, a user computing device may receive an output mesh from a multi-characteristic remeshing system, such as the system 130.

In some cases, a multi-characteristic remeshing system, such as the multi-characteristic remeshing system 130, may be configured to calculate multiple geometric characteristics of a graphical object. For instance, the multi-characteristic remeshing system may calculate multiple target geometric characteristics based on CGDL source text. In addition, the multi-characteristic remeshing system may create one or more specialized data structures that indicate the multiple geometric characteristics. For instance, the specialized multi-characteristic data structures may describe a map of points (or other data values) in a surface mesh, such as a map from an intrinsic field of vertices (or other mesh data values) to an extrinsic field of points (or other coordinate space data values). In some cases, the map may include one or more instructions, such as instructions described by an evaluation tree data structure. In addition, the map may describe relationships between input data values (e.g., vertex data values, sampling point data values) and output data values, such as mapping an input mesh vertex (or other data value) to a value in an output vector space (e.g., a point space). In addition, the multi-characteristic data structures may be provided to one or more geometric computation modules that calculate modifications to the multiple geometric characteristics. In some cases, generating a specialized multi-characteristic data structure based on CGDL source text may enable fast or more efficient surface mesh generation for a graphical object.

Figure 2:
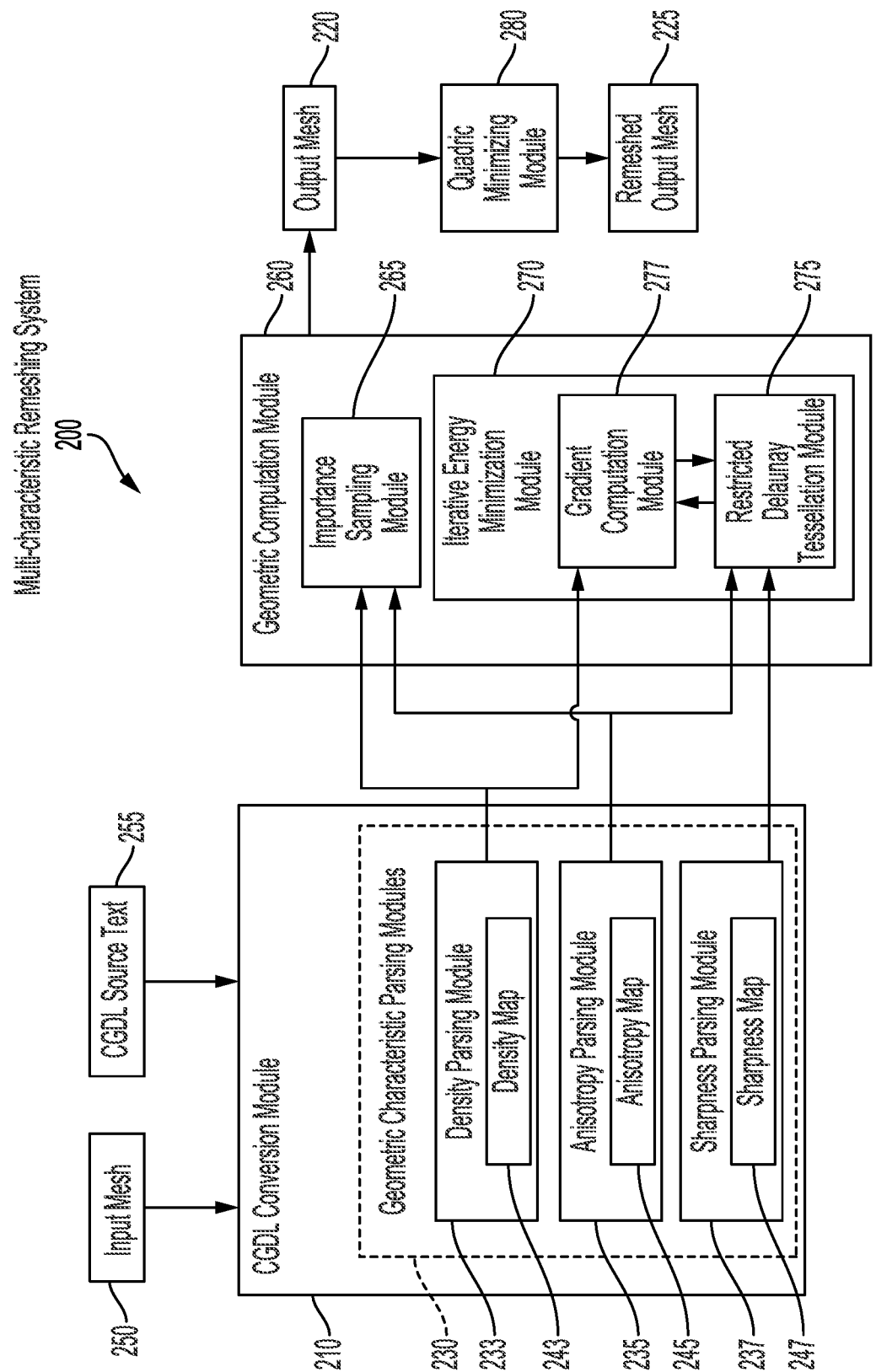
FIG. 2 is a diagram depicting an example of a multi-characteristic remeshing system, according to certain embodiments.

FIG. 2 is a diagram depicting an example of a multi-characteristic remeshing system 200. In some cases, the multi-characteristic remeshing system 200 is included in (or otherwise in communication with) a computer-implemented graphical environment. For instance, in the graphical environment 110 the multi-characteristic remeshing system 130 may be configured as (or otherwise include) the system 200. The multi-characteristic remeshing system 200 may include one or more of a CGDL conversion module 210 or a geometric computation module 260. In some cases, the CGDL conversion module 210 includes one or more geometric characteristic parsing modules 230, such as a density parsing module 233, an anisotropy parsing module 235, or a sharpness parsing module 237 (collectively referred to herein as the geometric characteristic parsing modules 230). In addition, the geometric computation module 260 may include one or more of an importance sampling module 265 or an iterative energy minimization module 270. In some cases, the iterative energy minimization module 270 may include one or more of a restricted Delaunay tessellation module 275 or a gradient computation module 277.

In FIG. 2, the multi-characteristic remeshing system 200 receives an input mesh 250 and a set of CGDL source text 255. In addition, the multi-characteristic remeshing system 200 provides as an output one or more of an output mesh 220 or a remeshed output mesh 225. In some cases, the input mesh 250 may be associated with a 3D graphical object, such as the surface mesh 150 associated with the graphical object 140. In addition, the CGDL source text 255 may be received from an additional computing system, such as the computer-implemented graphical environment 110 or the user computing devices 103 or 105. In FIG. 2, the CGDL source text 255 is described as being received from an additional computing system, but other implementations are possible. For example, the multi-characteristic remeshing system 200 may generate a set of CGDL source text based on, for example, one or more parameters describing target geometric characteristics of a graphical object, such as user inputs describing target characteristics of a desired output mesh, e.g., the output mesh 220.

In FIG. 2, the CGDL conversion module 210 may include one or more of the geometric characteristic parsing modules 230, such as the density parsing module 233, the anisotropy parsing module 235, or the sharpness parsing module 237. In some cases, one or more of the geometric characteristic parsing modules 230 may receive the input mesh 250 and the CGDL source text 255. One or more of the geometric characteristic parsing modules 230 may identify inherent geometric characteristics of the input mesh 250, such as position (e.g., edge, vertex), curvature, normal, or other suitable intrinsic properties that are inherent to the input mesh. In addition, one or more of the geometric characteristic parsing modules 230 may generate a respective geometric characteristic map. In FIG. 2, a geometric characteristic map may include a data object with at least one instruction that describes one or more relationships between characteristics of the input mesh 250 (e.g., inherent geometric characteristics) with additional geometric characteristics, such as a field of points in ambient (e.g., 3D) space or other geometric characteristics extrinsic to the input mesh 250.

For example, the density parsing module 233 may generate a density map 243 based on the input mesh 250 and at least one target density geometric characteristic from the CGDL source text 255. The density map 243 may describe a relationship of one or more inherent geometric characteristics with a target density characteristic, such as a target density of vertices. For instance, the density map 243 may include an instruction indicating a target density based on a multiplicative constant indicated by the CGDL source text 255. In addition, the density map 243 may be evaluated over a discrete point cloud, such as a point cloud with a quantity of points that are located within an ambient 3D space. As an example (and without limitation), the density parsing module 233 may generate the density map 243 based on Equation 1 as described below. In some cases, the density map 243 may be provided to multiple components of the geometric computation module 260, such as to the importance sampling module 265 or the gradient computation module 277.

In addition, the anisotropy parsing module 235 may generate an anisotropy map 245 based on the input mesh 250 and at least one target anisotropy geometric characteristic from the CGDL source text 255. The anisotropy map 245 may describe a relationship of one or more inherent geometric characteristics with a target anisotropy characteristic, such as a target stretching (or other transformation) of a local coordinate space. For instance, the anisotropy map 245 may include an instruction indicating a target transformation indicated by the CGDL source text 255. In addition, the anisotropy map 245 may map points from an ambient space to a symmetrical matrix space. As an example (and without limitation), the anisotropy parsing module 235 may generate the anisotropy map 245 based on Equation 2 as described below. In some cases, the anisotropy map 245 may be provided to multiple components of the geometric computation module 260, such as to the importance sampling module 265 or the restricted Delaunay tessellation module 275.

In addition, the sharpness parsing module 237 may generate a sharpness map 247 based on the input mesh 250 and at least one target sharpness geometric characteristic from the CGDL source text 255. The sharpness map 247 may describe a relationship of one or more inherent geometric characteristics with a target sharpness characteristic, such as a target preservation characteristic for the input mesh 250. For instance, the sharpness map 247 may include an instruction indicating vertices or edges (or both) of the input mesh 250 that are preservation constraints in the target output. For example, the sharpness map 247 may describe mesh vertices and mesh edges that are located at corners or edges of a 3D graphical object associated with the input mesh 250. In some cases, the sharpness map 247 includes a vector data object, in which each vertex (or edge) of the input mesh 250 is assigned a value indicating whether the vertex (or edge) is to be preserved in the output mesh 220. In FIG. 2, the sharpness map 247 can be a binary vector map, in which a vertex or edge is assigned a value of 1 to indicate preservation in the output mesh 220, or a value of 0 to indicate that no preservation is desired. However, other implementations are possible, such as a sharpness map that assigns a Boolean value (e.g., true/false) to indicate preservation in an output mesh, or other suitable data object describing preservation constraints. As an example (and without limitation), the sharpness parsing module 237 may generate the sharpness map 247 based on Equations 3-4 as described below. In some cases, the sharpness map 247 may be provided to at least one component of the geometric computation module 260, such as to the restricted Delaunay tessellation module 275.

In some cases, generating the maps 243, 245, and 247 based on the CGDL source text 255 improves consistency of geometric characteristics that are calculated by the multi-characteristic remeshing system 200. For example, each of the maps 243, 245, and 247 may be generated (or modified) based on the input mesh 250 and the particular target characteristics described by the CGDL source text 255. In addition, particular ones of the maps 243, 245, and 247 may be provided to multiple components in the geometric computation module 260. In some cases, generation of the maps 243, 245, and 247 by the CGDL conversion module 210 may improve usability of the multi-characteristic remeshing system 200, such as by simplifying steps performed by a graphical designer or programmer who desires to create a surface mesh for a 3D graphical object. For example, the components in the geometric computation module 260 may produce the output mesh 220 with fewer errors, or more similar to the user's desired output, based on consistency between the maps 243, 245, and 247 (e.g., based on the same set of CGDL source text 255). In some cases, a multi-characteristic remeshing system that generates geometric characteristic maps based on CGDL source text offers a technological improvement to steps previously performed by humans. For example, a person using contemporary single-purpose remeshing tools might spend time determining individual instructions (or other inputs) for each one of multiple computation modules, such as instructions for an importance sampling module, instructions for a gradient computation module, and instructions for a tessellation module. In addition to determining the individual instructions, the person using the example contemporary single-purpose remeshing tools might also spend time evaluating outputs from the multiple computation modules, such as checking an output from the example importance sampling module to evaluate whether the output is consistent (e.g., has vector data of suitable size, includes required data variables) as an input to the example gradient computation module.

In some cases, the output mesh 220 is produced by the geometric computation module 260. For example, the importance sampling module 265 may determine an estimated quantity of points in an output mesh, such as by analyzing density field data and anisotropy field data included in the density map 243 and the anisotropy map 245. As an example (and without limitation), the importance sampling module 265 may estimate points based on Equation 5 as described below, via a gradient descent technique with a restricted Delaunay tessellation update at each gradient iteration, or via another suitable importance sampling technique. In addition, the iterative energy minimization module 270 may determine locations of points in an output mesh, such as by calculating vertex locations in the output mesh based on the estimated points determined by the importance sampling module 265 and constraints indicated by the density map 243, the anisotropy map 245, and the sharpness map 247. In some cases, the iterative energy minimization module 270 calculates vertex locations iteratively, such as by minimizing an energy function describing relations between sampled point positions and additional geometric characteristics of the input mesh 250. The iterative energy minimization module 270 may iteratively compare the energy function to a threshold value, such that the minimized energy function is below (or has another relation to) the threshold value. As an example (and without limitation), the iterative energy minimization module 270 may determine point locations based on one or more of Equations 6-9 as described below, via an elimination-based sampling technique, or via another suitable energy minimization technique.

In some cases, the output mesh 220 is generated by the geometric computation module 260. For example, the output mesh 220 may include vertices at locations that are calculated by the iterative energy minimization module 270. In some implementations, the output mesh 220 is provided to a quadric minimizing module 280 that is included in the multi-characteristic remeshing system 200 (or in the geometric computation module 260). As a non-limiting example, the quadric minimizing module 280 may utilize one or more probabilistic quadric minimization techniques (e.g., pQEM framework). The quadric minimizing module 280 may, for example, modify locations of one or more vertices (or other geometric characteristics) in the output mesh 220. In addition, the quadric minimizing module 280 may generate a remeshed output mesh 225 based on the modified geometric characteristics of the output mesh 220. In some cases, the remeshed output mesh 225 may have improved visual fidelity, such as a more consistent appearance of the remeshed output mesh 225 in downsampling scenarios, compared to the output mesh 220.

In some implementations, the multi-characteristic remeshing system 200 may provide one or more of the output mesh 220 or the remeshed output mesh 225 to an additional computing system. For example, the multi-characteristic remeshing system 200 may provide the remeshed output mesh 225 to one or more of the computer-implemented graphical environment 110, the user computing device 103, or the user computing device 105. Additionally or alternatively, the multi-characteristic remeshing system 200 may provide one or more of the density map 243, the anisotropy map 245, or the sharpness map 247 to an additional computing system. For example, the multi-characteristic remeshing system 200 may provide the maps 243, 245, and 247 to one or more of the graphical environment 110 or the user computing devices 103 or 105. In addition, the multi-characteristic remeshing system 200 may provide data indicating that the maps 243, 245, and 247 are associated with a particular graphical object, such as the graphical object 140. Based on the maps 243, 245, and 247, the additional computing system may modify the associated particular graphical object with improved efficiency or consistency, as compared to performing local calculations related to modifying the particular graphical object. For example, after receiving the maps 243, 245, and 247, one or more of the graphical environment 110 or the user computing devices 103 or 105 may perform rapid modifications to the graphical object 140 using geometric characteristics described by the maps 243, 245, and 247.

In some cases, multiple modifications to a graphical object may be performed with high efficiency, based on multiple sets of CGDL source text and geometric characteristic maps that are exchanged between a multi-characteristic remeshing system and an additional computing system. For example, the multi-characteristic remeshing system 200 may receive multiple sets of CGDL source text that are relatively small and fast to transmit via a network connection, as compared to transmitting data describing a graphical object. In addition, the multi-characteristic remeshing system 200 may generate and provide multiple geometric characteristic maps that are also relatively small and fast to transmit, as compared to transmitting data describing a graphical object. In some cases, network traffic between the multi-characteristic remeshing system 200 and, for example, the user computing devices 103 or 105 may be reduced during multiple modifications to the graphical object 140, as compared to transmitting a modified graphical object via a network connection. In addition, modifying a graphical object based on multiple sets of CGDL source text and geometric characteristic maps may improve efficient use of computing resources, such as local processing resources for a user computing device. A user visual experience may also be improved, such as by increasing a speed at which modifications are made to a displayed graphical object (e.g., reducing loading time, reducing rendering time).

Figure 3:
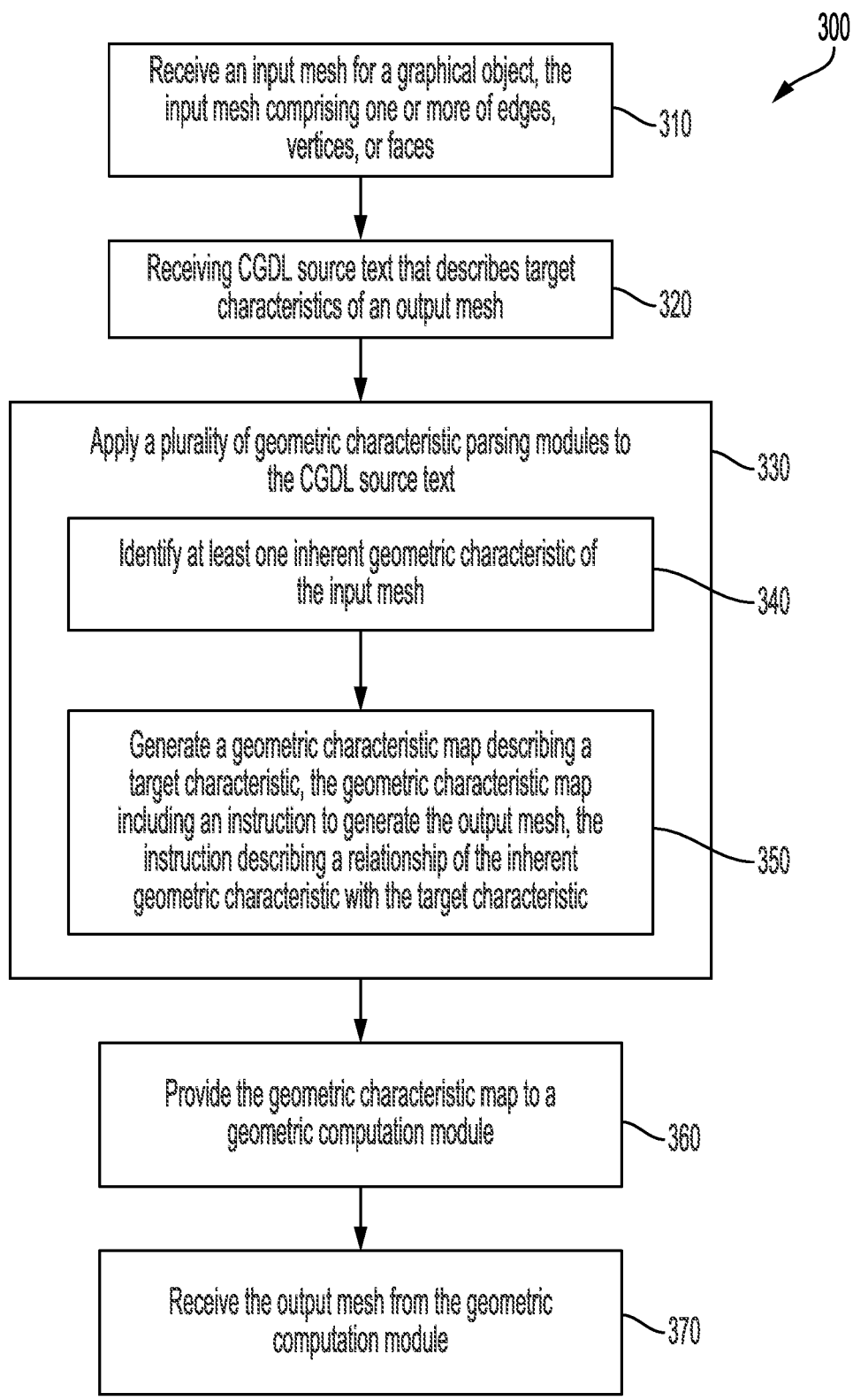
FIG. 3 is a flow chart depicting an example of a process for multi-characteristic remeshing of a graphical object, according to certain embodiments.

FIG. 3 is a flow chart depicting an example of a process 300 for multi-characteristic remeshing of a graphical object. In some embodiments, such as described in regards to FIGS. 1-2, a computing device executing a multi-characteristic remeshing system implements operations described in FIG. 3, by executing suitable program code. For illustrative purposes, the process 300 is described with reference to the examples depicted in FIGS. 1-2. Other implementations, however, are possible.

At block 310, the process 300 involves receiving an input mesh. The input mesh may be for a graphical object, such as a 3D graphical object. In addition, the input mesh may comprise one or more of edges, vertices, or faces that describe a surface of the 3D graphical object. The input mesh may be received by one or more components of a multi-characteristic remeshing system. For example, the CGDL conversion module 210 in the multi-characteristic remeshing system 200 may receive the input mesh 250.

At block 320, the process 300 involves receiving CGDL source text, such as at least one respective text data object for a geometric characteristic parsing module. The CGDL source text, or set of multiple CGDL source texts, may describe one or more target geometric characteristics of an output mesh for the 3D graphical object that is associated with the input mesh. For example, the CGDL source text 255 may describe one or more geometric characteristics for the output mesh 220. In some cases, the CGDL source text describes a target geometric characteristic that modifies an appearance of the 3D graphical object, such as a target density characteristic, a target anisotropy characteristic, or a target sharpness characteristic. Examples of geometric characteristics that may be described by the CGDL source text include (without limitation) density fields, volumetric fields, normals, triangle output, curvature, eigenvector fields, ellipsoid fields, thickness, or other suitable geometric characteristics of a surface mesh for a graphical object.

At block 330, the process 300 involves applying a plurality of geometric characteristic parsing modules to the CGDL source text. The geometric characteristic parsing modules may include one or more of a density parsing module, an anisotropy parsing module, or a sharpness parsing module. For example, the CGDL conversion module 210 may apply one or more of the density parsing module 233, anisotropy parsing module 235, or sharpness parsing module 237 to the CGDL source text 255.

In some cases, operations related to block 330 may include one or more operations related to block 340 or block 350. In addition, applying the plurality of geometric characteristic parsing modules may include each respective parsing module performing one or more operations, such as operations describe in regards to blocks 340 or 350.

At block 340, the process 300 involves identifying one or more inherent geometric characteristics of the input mesh. Examples of inherent geometric characteristics of an input mesh may include (without limitation) edge position, vertex position, Gaussian curvature, mean curvature normal, or other suitable intrinsic properties that are inherent to the input mesh. For example, one or more of the geometric characteristic parsing modules 230 may identify an inherent geometric characteristic of the input mesh 250.

At block 350, the process 300 involves generating one or more geometric characteristic maps, such as a density map, an anisotropy map, or a sharpness map. Each particular geometric characteristic map may describe at least one respective target characteristic. In addition, each particular geometric characteristic map may include at least one instruction for generating the output mesh having the respective target characteristic. The instruction may describe a relationship of at least one identified inherent geometric characteristic with the respective target characteristic of the particular geometric characteristic map. For instance, the density parsing module 233 may generate the density map 243 that includes an instruction describing a relationship of surface mesh vertices with a target density characteristic at multiple point locations in a 3D coordinate space. In addition, the anisotropy parsing module 235 may generate the anisotropy map 245 that includes an instruction describing a relationship of triangles in the input mesh 250 with a vector space that describes a local anisotropic transformation characteristic at each point in a 3D coordinate space. Further, the sharpness parsing module 237 may calculate the sharpness map 247 that includes an instruction describing a relationship of one or more surface mesh vertices or edges with a sharpness preservation constraint characteristic.

In some cases, the multi-characteristic remeshing system may receive a point cloud, such as a sampling point cloud described within an ambient 3D space. For example, the CGDL conversion module 210 may generate (or otherwise receive) a point cloud that includes sampled points (e.g., uniformly sampled) within a 3D coordinate space. In some cases, at least one geometric characteristic map may be generated based on the sample point cloud or an additional geometric value. For instance, a geometric characteristic map may indicate that a particular vertex or a particular edge from the surface mesh has a relationship with a group of one or more point locations in the sampling point cloud. The density map, for example, may indicate density of surface mesh vertices at each point in the sampling point cloud received by the multi-characteristic remeshing system. In addition, the anisotropy map may indicate a vector space at each point in the sampling point cloud. In some cases, a lift operator may be calculated that identifies an extrinsic point location in a coordinate space based on an intrinsic vertex in a surface mesh. For example, based on an inherent geometric characteristic identified by one or more of the geometric characteristic parsing modules 230, the CGDL conversion module 210 (or one of the modules 230) may calculate a lift operator that identifies an extrinsic point location in a coordinate space based on an intrinsic vertex of the input mesh 250.

At block 360, the process 300 involves providing the one or more geometric characteristic maps to a geometric computation module. In some cases, a particular geometric characteristic map may be provided to one or more components (or sub-components) included in the geometric computation module. For example, the density parsing module 23 may provide the density map 243 to one or more of the importance sampling module 265 or the gradient computation module 277. In addition, the anisotropy parsing module 235 may provide the anisotropy map 245 to one or more of the importance sampling module 265 or the restricted Delaunay tessellation module 275. Further, the sharpness parsing module 237 may provide the sharpness map 247 to at least the restricted Delaunay tessellation module 275. In some cases, one or more components of the geometric computation module may receive additional data, such as the input mesh associated with the 3D graphical object.

At block 370, the process 300 involves generating (or otherwise receiving) the output mesh. In some cases, the output mesh describes the surface of the 3D graphical object that is associated with the input mesh. In addition, the output mesh may have the one or more target characteristics described by the CGDL source text. For example, the 3D graphical object may have a modified appearance (or other geometrical property) based on the output mesh. In some cases, the modified appearance (or other property) is different from an appearance of the 3D graphical object based on the input mesh. In some cases, the output mesh may be generated by the geometric computation module. For example, the output mesh 220 may be generated by the geometric computation module 260. In addition, the output mesh may be minimized, such as via a minimization component included in one or more of the geometric computation module or the multi-characteristic remeshing system 200. For example, the remeshed output mesh 225 may be generated by the quadric minimizing module 280, based on the output mesh 220.

In some implementations, a multi-characteristic remeshing system may generate or evaluate a geometric characteristic map based on mathematical rules. For example, the multi-characteristic remeshing system 200 may calculate one or more values that identify mathematical relationships between input mesh characteristics and additional geometric characteristics. In some cases, the multi-characteristic remeshing system may receive an input mesh (e.g., the input mesh 250) that is described by M=(V, E, T) in which M describes the input mesh, T indicates a set of triangles (or other polygons) in the input mesh M, V describes the vertices in the set of triangles T, and E describes the edges in the set of triangles T. In addition, the multi-characteristic remeshing system may receive a discrete point cloud P (such as a sampling point cloud) that includes a quantity of points described within an ambient 3D Euclidean space. In some cases, one or more of M, V, E, T, or P may be represented by a data structure, such as a vector data object including numeric values describing each element (e.g., triangle, edge, vertex, point) included in the data object. The example multi-characteristic remeshing system may utilize one or more of the input mesh M or the point cloud P to calculate relationships between input mesh characteristics and additional geometric characteristics, such as a relationship described by an instruction within a geometric characteristic map. In some cases, a relationship may be described in regards to one or more of Equations 1-12.

In some cases, a density parsing module, such as the density parsing module 233, may generate a density map using Equation 1. The example density map may, for instance, include one or more instructions that describe mapping relationships based on Equation 1.

$$\mathbb{R}^3 \mapsto \mathbb{R}_{[0,\infty)} \qquad \text{Eq. 1}$$

In Equation 1, $\mathbb{R}^3$ includes points located within a coordinate space, such as a 3D coordinate space. For example, $\mathbb{R}^3$ may include points of a sampling point cloud P. In Equation 1, the density map may describe a target density of vertices, such as a target density indicated by a multiplicative constant indicated in a CGDL source text. For example, when evaluated over the point cloud P, the density map of Equation 1 may yield an array of |P| positive scalars. The array of positive scalars may have a size in a range of $[0, \infty)$. In some cases, a uniform density may be described as a nonzero constant map. In some cases, the density parsing module may determine a validity of a density map generated via Equation 1, such as by determining that the density map has a non-null sum.

In some cases, an anisotropy parsing module, such as the anisotropy parsing module 235, may generate an anisotropy map using Equation 2. The example anisotropy map may, for instance, include one or more instructions that describe mapping relationships based on Equation 2.

$$\mathbb{R}^3 \mapsto \text{Sym}_3 \sim \mathbb{R}^6 \qquad \text{Eq. 2}$$

In Equation 2, $\mathbb{R}^3$ includes the example points located within the coordinate space, such as the sampling point cloud P described in regards to Equation 1. In Equation 2, $\text{Sym}_3$ may represent a symmetric 3×3 matrix space, such as a matrix vector space that approximates a six-dimensional coordinate space $\mathbb{R}^6$. In Equation 2, the anisotropy map may describe a target transformation of a local region of the coordinate space $\mathbb{R}^3$, such as a target transformation indicated by a CGDL source text. For example, when evaluated for one or more points in the point cloud P, the anisotropy map of Equation 2 may provide a local anisotropic scalar product for the local region around each respective point in the point cloud P. In some cases, an isotropic transformation may be described by $\text{Sym}_3$ including a constant identity matrix. In some cases, the anisotropy parsing module may determine a validity of an anisotropy map generated via Equation 2, such as by determining that each matrix computed at each position of the point cloud P is positive with an eigenvalue greater than 1. In addition, determining validity of the anisotropy map may improve computational performance of a multi-characteristic remeshing system. For example, a valid anisotropy map calculated via Equation 2 may provide, at each point in the point cloud P, an invertible matrix having an eigenvalue bound requirement (e.g., greater than 1). In addition, the valid anisotropy map may simplify calculations performed by one or more modules in a geometric computation module, such as calculations to compute anisotropic Voronoi cells or calculating nearest neighbor queries for anisotropic restricted Delaunay tessellation.

In some cases, a sharpness parsing module, such as the sharpness parsing module 237, may generate a sharpness map using one or more of Equations 3-4. The example sharpness map may, for instance, include one or more instructions that describe mapping relationships based on one or more of Equations 3-4.

$$V \mapsto \{0,1\} \qquad \text{Eq. 3}$$

$$E \mapsto \{0,1\} \qquad \text{Eq. 4}$$

In Equation 3, each vertex in the vertices V is associated with a respective value for a preservation constraint. In Equation 4, each edge in the edges E is associated with a respective value for a preservation constraint. In some cases, the preservations constraint for each vertex and edge may have a binary value belonging to the range $\{0,1\}$. In Equations 3-4, a vertex or edge may be assigned a value of 1 to indicate that preservation is desired or a value of 0 to indicate that no preservation is desired. For example, the sharpness parsing module may determine, for each particular edge and particular vertex, whether the particular edge or particular vertex is to be preserved (e.g., a preservation constraint with value 1) in an output mesh, such as the output mesh 220. A vertex sharpness map calculated via Equation 3 may include a first binary map over the set of vertices V. An edge sharpness map calculated via Equation 4 may include a second binary map over the set of vertices E. For convenience, and not by way of limitation, the term "sticky" may identify vertices or edges that have a preservation constraint with value 1 (or otherwise indicated for preservation in an output mesh). In regards to Equations 3-4, sticky vertices may be included in a set $V_{sticky} \subset V$. In addition, sticky edges may be included in a set $E_{sticky} \subset E$.

In some cases, one or more components in a multi-characteristic remeshing system may calculate a lift operator. The lift operator may identify one or more relationships between values in the input mesh M=(V, E, T), such as vertex locations, and points in the point cloud P. For example, the CGDL conversion module 210 or one or more of the geometric characteristic parsing modules 230 may calculate a lift operator that transforms a vertex-defined intrinsic discrete field into an extrinsic discrete field. For instance, the CGDL conversion module 210 may calculate a lift operator for the input mesh 250. The lift operator may transform the vertices V within $\mathbb{R}^{arb}$ (e.g., a coordinate space $\mathbb{R}^{arb}$ having an arbitrary quantity of dimensions) to the point cloud P within $\mathbb{R}^3$. In some cases, calculating a lift operator may include projecting one or more sampling points $p_i \in P$ from the point cloud P into a mesh point $q_i$ and a triangle $t_i \in T$ that corresponds to the mesh point $q_i$. The mesh point $q_i$ may be a sampling point on the mesh, such as a point location that is calculated via a blue noise sampling technique. In some cases, projecting one or more sampling points $p_i$ into respective mesh points $q_i$ may be performed using a precomputed bounding volume hierarchy structure, such as to improve computational efficiency.

In addition, calculating the lift operator, such as for the input mesh 250, may include computing barycentric coordinates of each mesh point $q_i$ with respect to the corresponding triangle $t_i$. In some cases, calculating the lift operator includes computing, for each mesh point $q_i$, a linear interpolation coefficient from the barycentric coordinates with respect to each vertex of the corresponding triangle $t_i$. In some cases, the CGDL conversion module 210 (or another component of a multi-characteristic remeshing system) may generate a spare matrix representing the lift operator for the input mesh 250, such as by calculating a row of the sparse matrix (e.g., for a particular mesh point $q_i$) that includes one or more linear interpolation coefficients.

In some cases, one or more geometric computation modules of a multi-characteristic remeshing system use one or more values related to Equations 1-4 or a lift operator to generate an output mesh. For example, one or more of the importance sampling module 265, the gradient computation module 277, or the restricted Delaunay tessellation module 275 may generate the output mesh 220 based on geometric characteristic maps or other data received from the CGDL conversion module 210, such as data describing a lift operator, the mesh point $q_i$, barycentric coordinates, or other suitable data.

In some cases, importance sampling may be calculated using data generated via one or more of Equations 1-4. For example, an importance sampling module, such as the module 265, may provide initial point samples for calculating an output mesh. In some cases, the importance sampling module calculates a weight for one or more points $p_i$ from the point cloud P based on density or anisotropy maps calculated via, at least, Equations 1 and 2. In some cases, the importance sampling module calculates each weight using Equation 5.

$$w_{ij} = \left(1 - \frac{d_{max}\sqrt{(p_j - p_i)^T M_i(p_j - p_i)}}{2d_i \lambda_{max} r_{max}}\right)^\beta \qquad \text{Eq. 5}$$

In Equation 5, a weight $w_{ij}$ may be calculated for point $p_i$ with respect to point $p_j$ from the point cloud P. In addition, $d_i$ may be a sampled density at a site i associated with the point $p_i$, such as a density calculated via Equation 1. Further, $d_{max}$ may be a maximum density value calculated over multiple points the point cloud P, such as a maximum from an array of |P| positive scalars calculated via Equation 1. In Equation 5, $M_i$ may be a positive definite anisotropy matrix sampled at point $p_i$, such as a matrix vector space calculated via Equation 2 for the point $p_i$. In addition, $\lambda_{max}$ may be a maximum eigenvalue, such as a maximum of eigenvalues of matrix vector spaces calculated via Equation 2. In some cases, values for a maximum query radius $r_{max}$ and a factor $\beta$ may be determined based on a default value, a user input (e.g., indicated by a CGDL source text), or another suitable value. In some cases, one or more initial point samples are identified based on a corresponding weight $w_{ij}$. For instance, a mesh point $q_i$ (e.g., as described in regards to a lift operator) may be identified (or selected from a larger set of points $q_i$) based on the mesh point $q_i$ having an associated weight $w_{ij}$ that exceeds (or has another relation to) a sampling weight threshold.

In some cases, energy minimization may be calculated using data generated via one or more of Equations 1-5. For example, a restricted Delaunay tessellation module, such as the module 275, may provide one or more of Voronoi cells or restricted triangulation values for generating a surface mesh. In addition, a gradient computation module, such as the module 277, may provide updated samples to the restricted Delaunay tessellation module, such as during an iterative energy minimization. In some cases, one or more modules in an iterative energy minimization module, such as the module 270, may calculate an energy function based on density, anisotropy, or sharpness maps calculated via, at least, Equations 1-4. In some cases, the iterative energy minimization module calculates the energy function described in Equations 6-8.

$$E = (1-\alpha)E_{Barycenter} + \alpha E_{Attachment} \qquad \text{Eq. 6}$$

$$E_{Barycenter} = \Sigma_{p_i \in P}(b_i - p_i)^2 \qquad \text{Eq. 7}$$

$$E_{Attachment} = \Sigma_{p_i \in P} d_i^2 (q_i - p_i)^2 \qquad \text{Eq. 8}$$

In Equation 6, energy E is calculated as a sum of terms $E_{Barycenter}$ and $E_{Attachment}$. A scalar parameter $0 < \alpha < 1$ may be applied to balance the effects of the terms $E_{Barycenter}$ and $E_{Attachment}$. In Equation 7, $E_{Barycenter}$ may be calculated as a sum, for all points $p_i$ belonging to the point cloud P, of a difference between barycenter $b_i$ and the point $p_i$. In addition, the barycenter $b_i$ may be an anisotropic barycenter of a restricted Voronoi cell for a site i associated with the point $p_i$. In Equation 8, $E_{Attachment}$ may be calculated as a sum, for all points $p_i$ belonging to the point cloud P, of a difference between mesh point $q_i$ and the point $p_i$, multiplied by the sampled density $d_i$ at the site i for the point $p_i$. For example, $E_{Attachment}$ may be calculated as a quadratic attachment term, such as $(q_i - p_i)^2$, that is weighted by a density term, such as d?. In some cases, density constraints for the energy function may be enforced via the $E_{Attachment}$ term. In some implementations, minimization of the $E_{Attachment}$ term may require increased computation resources per iteration while requiring fewer iterations to converge, resulting in an overall improvement (e.g., decrease) in usage of computational resources, as compared to contemporary techniques for enforcing density constraints.

In some implementations, one or more preservation constraints are enforced via an iterative energy minimization module. For example, the iterative energy minimization module, such as the module 270, may identify at least one barycenter $b_i$, as described in regards to Equations 6-8, based on one or more of an edge sharpness map or a vertex sharpness map calculated via Equations 3-4. In some cases, the iterative energy minimization module generates (or otherwise receives) one or more of a set of sticky vertices $V_{sticky} \subset V$ or a set of sticky edges $E_{sticky} \subset E$ based on a sharpness map, such as the sharpness map 247. In some cases, the iterative energy minimization module identifies a barycenter via Equation 9, at least.

$$b_i = \begin{cases} b_i^{0D} \exists\ C_{iklm} \in C_i,\ C_{iklm} \cap V_{sticky} \neq \emptyset \\ b_i^{1D} \exists\ C_{iklm} \in C_i,\ C_{iklm} \cap E_{sticky} \neq \emptyset \\ b_i^{2D}\ \text{otherwise} \end{cases} \qquad \text{Eq. 9}$$

In Equation 9, a barycenter $b_i$ may be identified as a zero-dimensional barycenter $b_i^{0D}$, a one-dimensional barycenter $b_i^{1D}$, or a two-dimensional barycenter $b_i^{2D}$. In addition, the barycenter $b_i$ may be identified based on a Voronoi cell $C_i$. In some cases, the Voronoi cell $C_i$ is the restricted Voronoi cell for a site i associated with the point $p_i$, such as described in regards to Equations 6-8. In Equation 9, $C_{iklm}$ is a disjoint union of fragments over triangles contributing to the Voronoi cell $C_i$. A zero-dimensional barycenter $b_i^{0D}$ may be identified for a cell $C_i$ having fragments $C_{iklm}$ that intersect with the set of sticky vertices $V_{sticky}$. A one-dimensional barycenter $b_i^{1D}$ may be identified for a cell $C_i$ having fragments $C_{iklm}$ that intersect with the set of sticky edges $E_{sticky}$. A two-dimensional barycenter $b_i^{2D}$ may be identified for a cell $C_i$ having fragments $C_{iklm}$ that do not intersect with the sets $V_{sticky}$ or $E_{sticky}$.

In some implementations, a CGDL source text, such as the CGDL source text 255, may include a statement that conforms to a formal grammar. For example, each statement of a CGDL source text may include one or more symbols, operations, or functional calls that are evaluated according to an algebraic field grammar. Table 1 provides an example group of symbols, rules, or definitions that may be used to implement a formal grammar for a CGDL source text.

TABLE 1

| | | |
|---|---|---|
| statement | → | var_assign \| func_assign \| final_calc |
| var_assign | → | name '=' final_calc |
| func_assign | → | name '(' name (',' name)? ')' '=' final_calc |
| final_calc | → | calc at_end |
| calc | → | ternary \| comparison \| sum |
| sum | → | mult (('+' \| '−') mult)* |
| mult | → | factor (('*' \| '/') factor)* |
| factor | → | term \| power |
| power | → | term '^' factor |
| term | → | scalar \| func_call \| var_lookup \| group |
| number | → | scalar |
| group | → | '(' calc ')' |
| var_lookup | → | name |
| func_call | → | name '(' calc(',' calc)? ')' |
| comparison | → | sum ('<' \| '>') '=? sum |
| ternary | → | (comparison \| sum) '?' calc ':'calc |
| terminal symbol | → | scalar \| name \| at_end |

Figure 4:
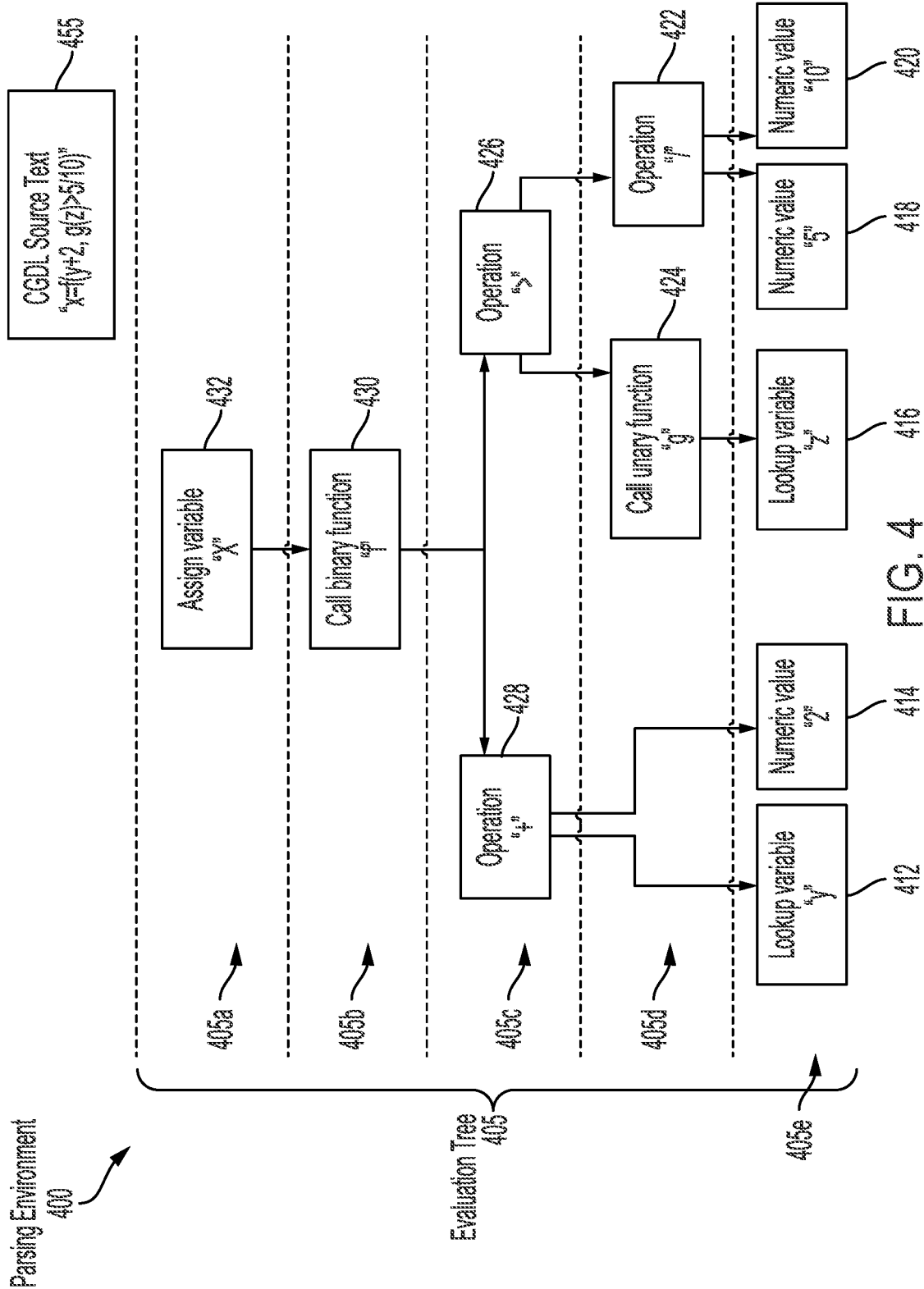
FIG. 4 is a diagram depicting an example of a parsing environment that may be implemented by one or more graphical parsing modules, according to certain embodiments.

In some cases, a CGDL source text may be converted to an instruction, such as by one or more geometric characteristic parsing modules. Evaluation of a CGDL source text statement may include a systematic evaluation of one or more symbols or rules (e.g., operations, functional calls) that are described by a formal grammar of the CGDL source text, such as the example formal grammar indicated in Table 1. FIG. 4 is a block diagram depicting an example of a parsing environment 400 that may be implemented by one or more graphical parsing modules. In the parsing environment 400, a graphical parsing module, such as one or more of the graphical parsing modules 230, may receive CGDL source text, such as a CGDL source text 455. As an example, and not by way of limitation, the CGDL source text 455 includes an example statement "x=f(y+2, g(z)>5/10)" that may be evaluated by the parsing environment 400.

In some cases, the parsing environment 400 may include one or more data structures to parse the CGDL source text to determine the variables, parameters or other terms contained in the CGDL source text based on a formal grammar (such as in Table 1). For example, the parsing environment 400 may parse the CGDL source text to generate a tree data structure (or another suitable data structure) according to the grammar listed in Table 1, such as an evaluation tree 405. In addition, a geometric characteristic parsing module may utilize the parsing environment 400 to generate instructions described by the CGDL source text 455, such as populating the evaluation tree 405 with instructions indicated by one or more of nodes 412-432. In some cases, a geometric characteristic map, such as one or more of the maps 243, 245, or 247, may include at least one evaluation tree (or other suitable data structure) that describes instructions of the geometric characteristic map.

At one or more levels of the evaluation tree 405, such as the example levels 405a-405e, the parsing environment 400 may identify terms in the CGDL source text 455. For example, at a highest (e.g., initial) level 405a, the parsing environment 400 may identify "x=" as part of a variable assignment statement, such as indicated by the grammar "var_assign" in Table 1. Using the "x=" term, the parsing environment 400 may generate node 432 at the highest level 405a of the evaluation tree 405, e.g., a root node of the tree.

In some cases, the parsing environment 400 may identify one or more calculations described by the CGDL source text 455. As part of the example variable assignment "x=" statement, the parsing environment 400 may identify the term "f(y+2, g(z)>5/10)" as a final calculation "final_calc" according to Table 1. Based on Table 1, final_calc has a "calc" element that can be "ternary," "comparison," or "sum." The parsing environment 400 may identify the term "f(y+2, g(z)>5/10)" as a "sum" (e.g., rather than "ternary" or "comparison"). The parsing environment 400 may further identify through the description of "sum," "mult," "factor," and "term" in Table 1 that "f(y+2, g(z)>5/10)" is a function call "func_call" and determine that various portion of the "func_call" based on the definition "func_call→name '(' calc (',' calc)?')'. For example, the parsing environment 400 may determine the "name" of the function as being "f," "calc" being "y+2", another "calc" being "g(z)>5/10," and so on. Using the "f(·)" function, the parsing environment 400 may generate node 430 at level 405b of the evaluation tree 405.

The parsing environment 400 may further parse the elements in the function call "f" in a similar way. For example, for the first "calc" element "y+2" in the "f" function call, the parsing environment 400 may identify, based on the "+" element, that this is a "sum" operation between two "mult" elements "2" and "y." The parsing environment may further determine that these two elements are terminal symbols and no more parsing is needed. Based on this parsing, the parsing environment 400 may generate the node 428 for the "+" operation and nodes 412 and 414 for "y" and "2," respectively. Following a similar procedure, the parsing environment 400 may parse "g(z)>5/10" and generate nodes 416-426 as shown in FIG. 4.

In the above examples, the parsing environment 400 may identify assigned variables described by the CGDL source text 455. In some cases, a variable may indicate multiple values, such as a vector of values associated with a point cloud, a set of vertices, or other geometric values. For example, the "y" and "z" terms may be identified as names of variables that are assigned, e.g., via "var_assign" CGDL source text statements parsed prior to the source text 455. The parsing environment 400 may identify the "y" and "z" terms as being indicated by the grammar "var_lookup" in Table 1. In addition, the parsing environment 400 may use the identified variables to populate additional instructions in the evaluation tree 405. For example, the parsing environment 400 may generate node 416 using the "z" variable, such as a leaf node from the node 424 at level 405e.

In some cases, the parsing environment 400 may identify data types indicated by the CGDL source text 455, such as scalar numbers indicated by the grammar "number" in Table 1. For example, the parsing environment 400 may generate blocks 412 and 414 respectively using a numeric value "2" and the "y" variable, such as leaf nodes from the node 428 at level 405e. In addition, the parsing environment 400 may generate blocks 418 and 420 using numeric values "5" and "10" respectively, such as leaf nodes from the node 422 at level 405e. In some cases, a geometric characteristic map may be generated (or modified) based on CGDL source text parsed within the parsing environment 400. For example, a geometric characteristic parsing module may generate a density map, an anisotropy map, or a sharpness map that includes instructions described by the evaluation tree 405. A geometric computation module, such as one or more of the importance sampling module 265 or iterative energy minimization module 270, may generate an output mesh by performing instructions included in an evaluation data structure, such as the tree 405. In some cases, one or more instructions are performed on multiple values, such as an instruction applied to a vector of values. For example, instructions in the evaluation tree 405 may be applied to a vector representing multiple vertices in a mesh, or other geometric values. In addition, a result of evaluated instructions may be a vector of values, such as a modified vector associated with modified vertices or other geometric values.

Figure 5:
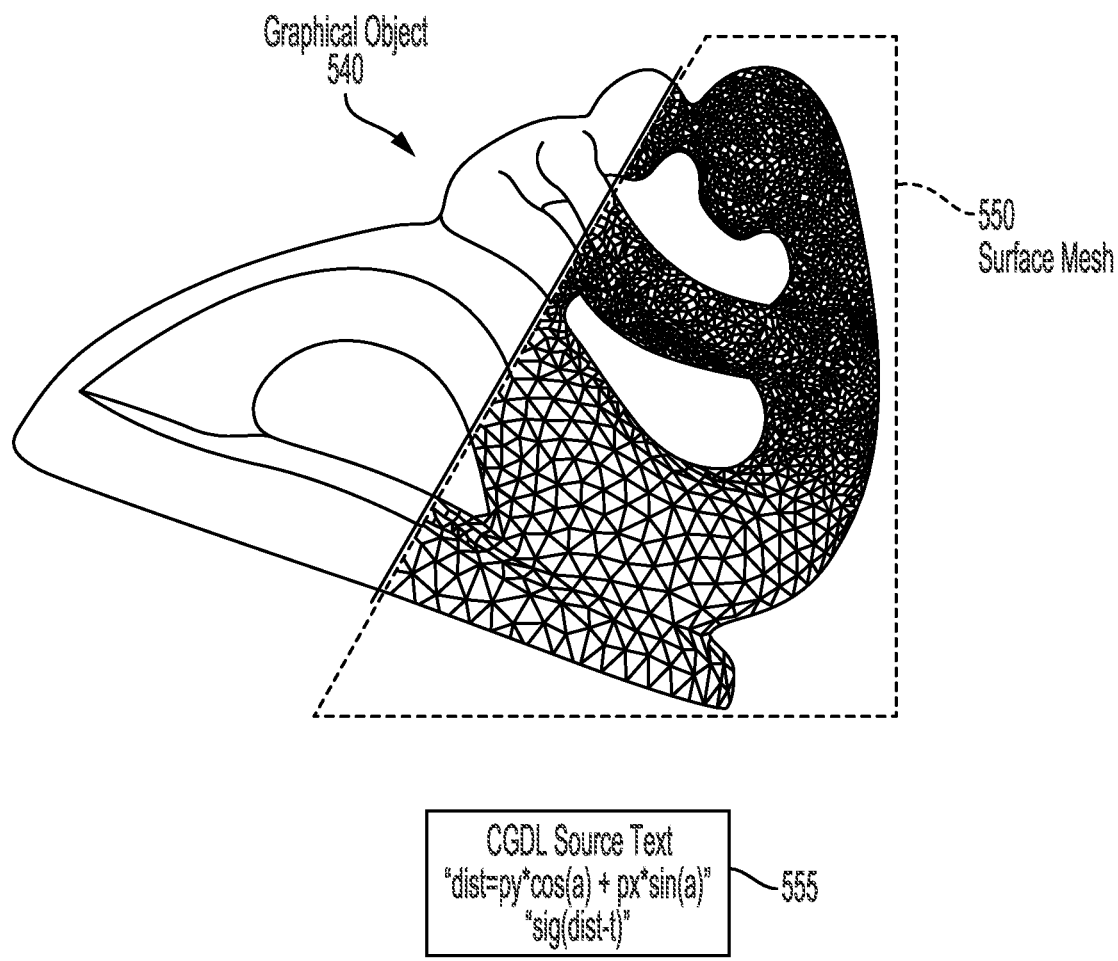
FIG. 5 is a diagram depicting an example of a graphical object represented via a surface mesh, according to certain embodiments.

In some implementations, one or more geometric computation modules in a multi-characteristic remeshing system may receive, as an input, a geometric characteristic map with an evaluation data structure, such as the evaluation tree 405. In addition, the one or more geometric computation modules may implement instructions described by the evaluation data structure. Based on the instructions, the geometric computation modules may generate an output mesh. FIG. 5 is a diagram depicting an example graphical object 540. The graphical object 540 may be represented by a surface mesh 550. In addition, the surface mesh 550 may have target geometric characteristics that are described by a CGDL source text 555. For example, the surface mesh 550 may be generated by the geometric computation module 260, such as via one or more geometric characteristic maps generated based on interpretation of the CGDL source text 555 by the geometric characteristic parsing modules 230.

As an example, and not by way of limitation, the CGDL source text 555 may describe target density characteristics for the surface mesh 550. In addition, an example density map generated by parsing the CGDL source text 555 (such as described with respect to FIG. 4) may include instructions to generate or derive the target density characteristics. For example, the density map may include instructions (e.g., organized via an evaluation structure such as the tree 405) to identify data values for coordinates "py" and "px" of multiple points in a sampling point field around the graphical object 540. The instructions may include a calculation for a position-dependent density distribution "dist" that is based on the coordinates "py" and "px" multiplied by cosine and sine functions. The instructions may further include a calculation for a sigmoid function "sig" for smoothing the position-dependent density distribution.

Based on the example density map, the surface mesh 550 may be generated according to the target density characteristics calculated according to the example instructions. For instance, according to the calculated target density characteristics, the surface mesh 550 has a target characteristic of an increased density of triangles near a first region of the object 540, e.g., a top region in the view of FIG. 5. For instance, the first region may include relatively many triangles that are relatively small. In addition, the surface mesh 550 has a target characteristic of a decreased density of triangles near a second region of the object 540, e.g., a bottom region in the view of FIG. 5. For instance, the second region may include relatively fewer triangles that are relatively larger, as compared to the first region. In FIG. 5, the calculated target density characteristics (e.g., a density field) is shown on the left region of the view, e.g., a region shown without the surface mesh 550.

Figure 6:
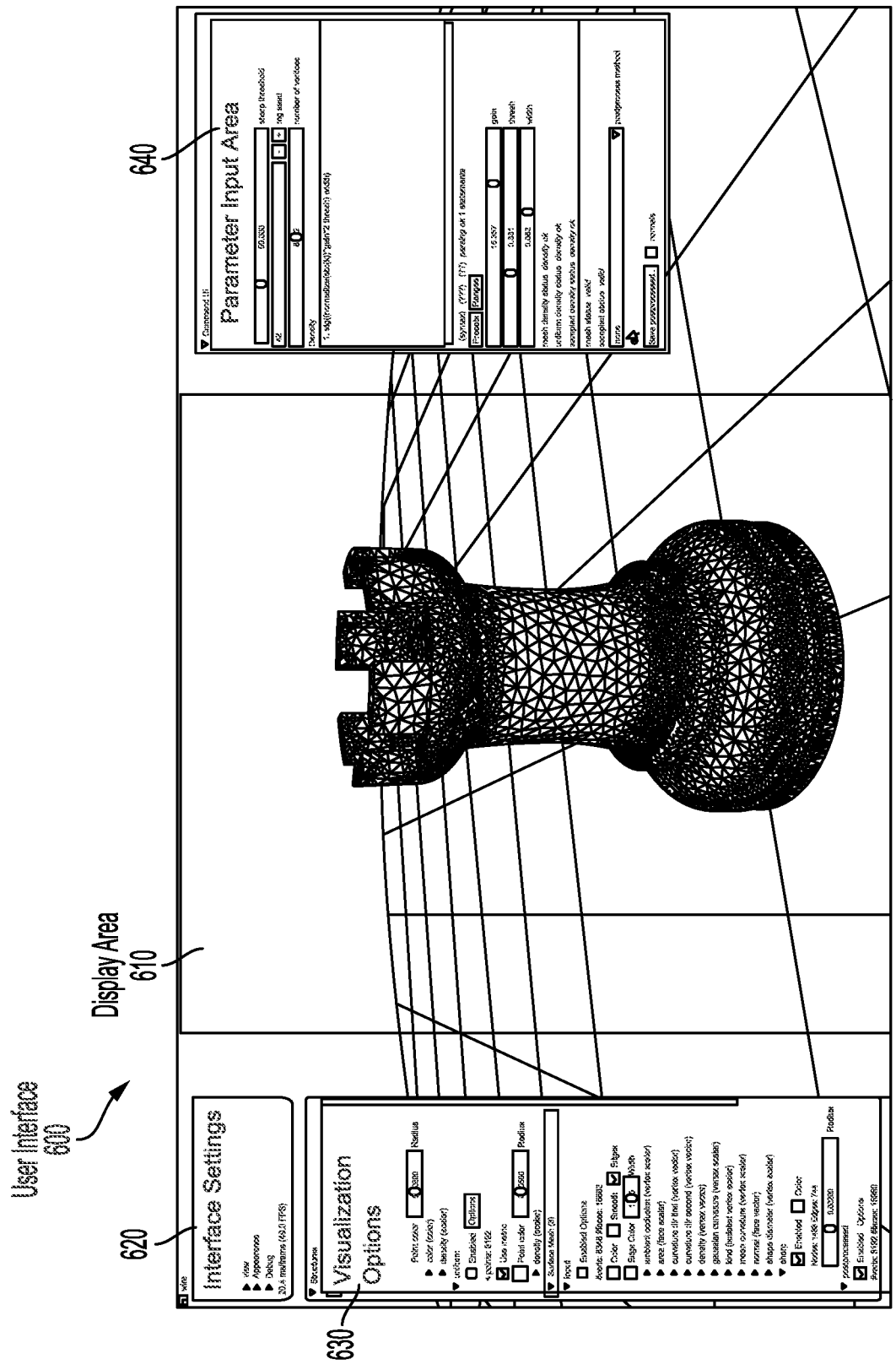
FIG. 6 is a diagram depicting an example of a user interface by which a user could provide inputs to a multi-characteristic remeshing system, according to certain embodiments.

In some implementations, a multi-characteristic remeshing system may provide data describing a user interface. FIG. 6 is a diagram depicting an example of a user interface 600 by which a person could provide inputs to a multi-characteristic remeshing system, such as the multi-characteristic remeshing systems 100 or 200. In some cases, the user interface 600 may be provided via one or more display devices on an additional computing system. For example, one or more of the user computing devices 103 or 105 may display the user interface 600, based on data received from the example multi-characteristic remeshing system 200.

The user interface 600 may include at least one a display area 610. The display area 610 may be configured to provide a visual representation of one or more graphical objects, such as the graphical object 140. In FIG. 6, the user interface 600 may include at least one area by which parameters could be input, such as a parameter input area 640. The parameter input area 640 may include one or more regions by which a user could provide parameters for target geometric characteristics of a graphical object (e.g., an object displayed via the display area 610). For example, the parameter input area 640 may include a text entry region, in which one or more CGDL source text statements may be entered by the user. In addition, the parameter input area 640 may include one or more controls by which parameters could be provided for modifying target geometric characteristics of a graphical object, such as a slider indicating a desired value for sharpness or another suitable geometric characteristic. In some cases, the parameter input area 640 may display CGDL source text (such as in the text entry region) that describes target characteristics indicated by input parameters. For example, the CGDL conversion module 210 may generate a CGDL source text statement describing a target geometric characteristics indicated by a parameter input via the example slider (or other control). In addition, the parameter input area 640 may provide information about entered parameters, such as displaying an alert for entered text that does not satisfy a formal grammar of CGDL source text.

In some implementations, the display area 610 modifies an appearance of a displayed graphical object based on inputs received via the parameter input area 640. For example, responsive to an input to the parameter input area 640, one or more CGDL source text statements may be generated. In some cases, the CGDL source text may be generated by a computing system that provides the user interface 600, such as a multi-characteristic remeshing system. In addition, CGDL source text may be generated by an additional computing system, such as a computing device that displays the user interface 600. In some cases, a geometric characteristic parsing module, such as one or more of the parsing modules 230, may parse the CGDL source text and generate a geometric characteristic map as described above with respect to, at least, FIGS. 2 and 4. In addition, a geometric computation module, such as the geometric computation module 260, may generate an output surface mesh for the graphical object based on a geometric characteristic map as described above with respect to, at least, FIGS. 2-3. The user interface 600 may modify the display area 610 to display the graphical object with the output surface mesh. In some cases, a user may enter parameters for multiple geometric characteristics and rapidly view the resulting appearance modifications to the graphical object. For example, responsive to each input received via the parameter input area 640, the multi-characteristic remeshing system 200 may provide one or more of the density map 243, anisotropy map 245, or sharpness map 247 to a computing system providing the user interface 600. In addition, the user interface 600 may update a surface mesh of the displayed graphical object based on each received map, allowing the user to view and consider multiple target geometric characteristics in real-time or nearly real-time (e.g., without interruption to the user).

In some cases, the user interface 600 may include one or more regions for settings, such as interface settings 620. For example, the interface settings 620 may include one or more controls (e.g., buttons, sliders, text input fields) by which a user could control how the display area 610 (or other portions of the user interface 600) provide data. As non-limiting examples, the interface settings 620 could include controls related to device graphics hardware, device resolution, access to additional objects (e.g., from the object library 180), or other controls for suitable aspects of the user interface 600 or an associated multi-characteristic remeshing system.

In addition, the user interface 600 may include one or more regions for visualization options, such as visualization options 630. The visualization options 630 may include one or more controls by which a user could control how geometric characteristics of a graphical object are presented, e.g., via the display area 610. As non-limiting examples, the interface settings 620 could include controls related to color display; dimensionality of displayed graphical objects; visibility of points, barycenters, Voronoi cells, or other geometric characteristics; or other controls for suitable geometric characteristics of a graphical object displayed via the user interface 600.

Figure 7:
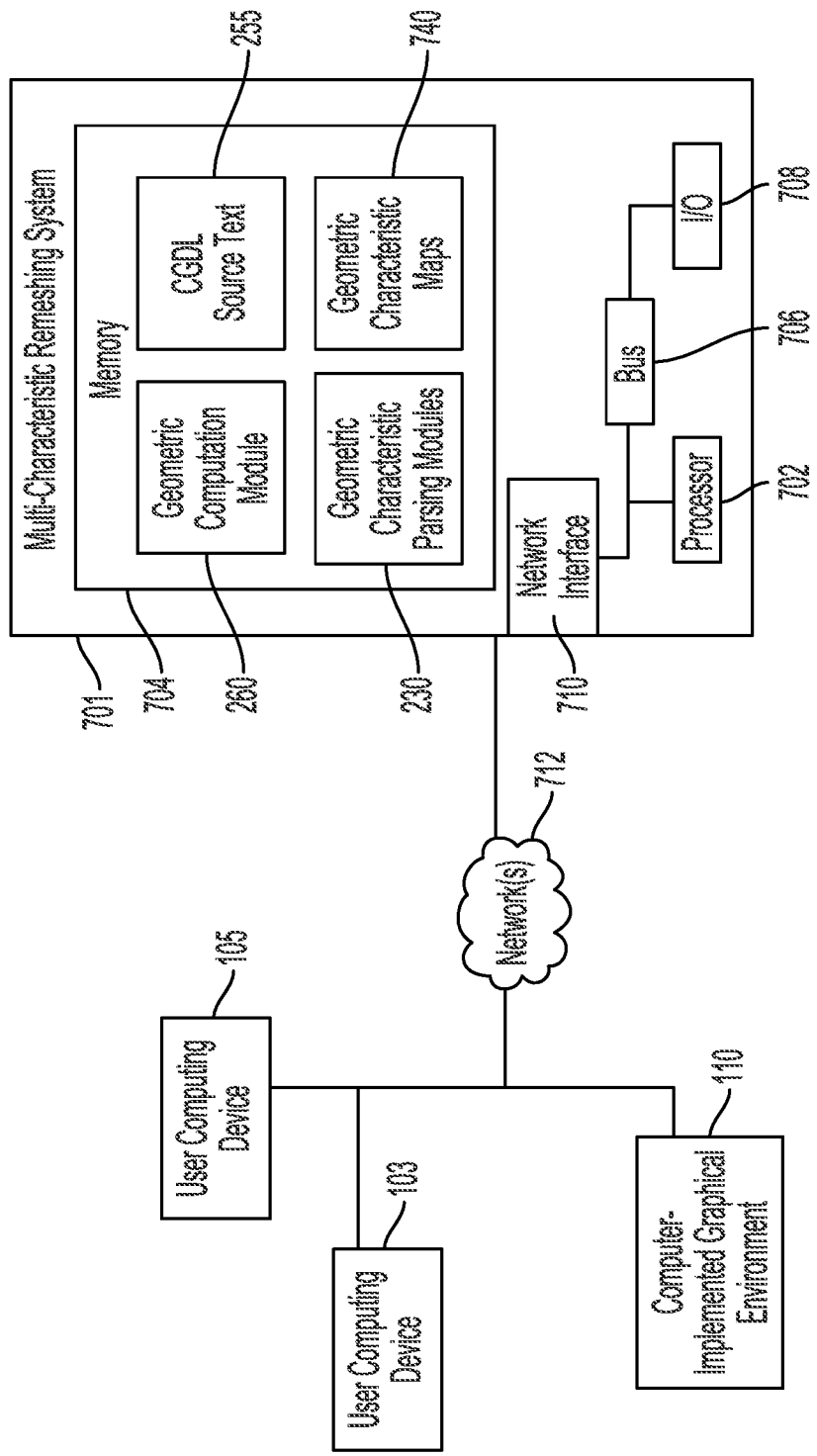
FIG. 7 is a diagram depicting an example of a computing system for implementing a multi-characteristic remeshing system, according to certain embodiments.

Any suitable computing system or group of computing systems can be used for performing the operations described herein. For example, FIG. 7 is a block diagram depicting a computing system capable of implementing a multi-characteristic remeshing system, according to certain embodiments.

The depicted example of a multi-characteristic remeshing system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the geometric computation module 260, the geometric characteristic parsing modules 230, the CGDL source text 255, one or more geometric characteristic maps 740, and other received or determined values or data objects. The geometric characteristic maps 740 may include, for instance, one or more of the density map 243, the anisotropy map 245, or the sharpness map 247. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read computer-readable instructions. The computer-readable instructions may include processor-specific computer-readable instructions generated by a compiler or an interpreter from code written in any suitable computer-programming language, including, for example, C, C++, C#, Visual Basic, Java, Python, Perl, JavaScript, and ActionScript.

The multi-characteristic remeshing system 701 may also include a number of external or internal devices such as input or output devices. For example, the multi-characteristic remeshing system 701 is shown with an input/output ("I/O") interface 708 that can receive input from input devices or provide output to output devices. A bus 706 can also be included in the multi-characteristic remeshing system 701. The bus 706 can communicatively couple one or more components of the multi-characteristic remeshing system 701.

The multi-characteristic remeshing system 701 executes program code that configures the processor 702 to perform one or more of the operations described above with respect to FIGS. 1-6. The program code includes operations related to, for example, one or more of the geometric computation module 260, the geometric characteristic parsing modules 230, the CGDL source text 255, the geometric characteristic maps 740, or other suitable applications or memory structures that perform one or more operations described herein. The program code may be resident in the memory device 704 or any suitable computer-readable medium and may be executed by the processor 702 or any other suitable processor. In some embodiments, the program code described above, the geometric computation module 260, the geometric characteristic parsing modules 230, the CGDL source text 255, and the geometric characteristic maps 740 are stored in the memory device 704, as depicted in FIG. 7. In additional or alternative embodiments, one or more of the geometric computation module 260, the geometric characteristic parsing modules 230, the CGDL source text 255, the geometric characteristic maps 740, and the program code described above are stored in one or more memory devices accessible via a data network, such as a memory device accessible via a cloud service.

The multi-characteristic remeshing system 701 depicted in FIG. 7 also includes at least one network interface 710. The network interface 710 includes any device or group of devices suitable for establishing a wired or wireless data connection to one or more data networks 712. Non-limiting examples of the network interface 710 include an Ethernet network adapter, a modem, and/or the like. The multi-characteristic remeshing system 701 is able to communicate with one or more of the computer-implemented graphical environment 110 and the user computing devices 103 and 105 using the network interface 710. Although FIG. 7 depicts the user computing devices 103 and 105 as being connected to multi-characteristic remeshing system 701 via the networks 712, other embodiments are possible, including the multi-characteristic remeshing system 701 communicating with the user computing devices 103 and 105 via one or more additional computing systems, such as the computer-implemented graphical environment 110.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for generating remeshed three-dimensional ("3D") graphical surfaces, the method comprising:
   receiving an input mesh for a 3D graphical object, the input mesh comprising edges and vertices describing a surface of the 3D graphical object;
   receiving compact geometric descriptive language ("CGDL") source text that describes target characteristics of an output mesh of the 3D graphical object;
   applying a plurality of geometric characteristic parsing modules to the CGDL source text by performing, by each respective parsing module in the plurality of geometric characteristic parsing modules:
   (i) identifying one or more inherent geometric characteristics of the input mesh, and
   (ii) generating a geometric characteristic map describing a respective target characteristic, wherein the geometric characteristic map includes an instruction to generate the output mesh having the respective target characteristic, wherein the instruction describes a relationship of the one or more inherent geometric characteristics with the respective target characteristic;
   providing the geometric characteristic map to a geometric computation module; and
   receiving, from the geometric computation module, the output mesh having the target characteristics.

2. The method of claim 1, wherein the geometric characteristic parsing modules include one or more of a density parsing module, an anisotropy parsing module, or a sharpness parsing module.

3. The method of claim 1, further comprising:
   calculating point locations in a coordinate space, wherein the point locations are based on the one or more inherent geometric characteristics of the input mesh;
   calculating, based on the instruction, a target density of the point locations within the coordinate space; and
   calculating, for each particular point location within the coordinate space, a scalar value indicating the target density at the particular point location.

4. The method of claim 1, further comprising:
   calculating point locations in a coordinate space, wherein the point locations are based on the one or more inherent geometric characteristics of the input mesh; and
   calculating, based on the instruction and the point locations, a symmetric matrix space, wherein within the symmetric matrix space, a particular symmetric matrix for a respective point location of the point locations describes a local anisotropic scalar product.

5. The method of claim 1, further comprising:
   identifying, based on the instruction and for each of the vertices on the surface of the 3D graphical object, a particular preservation constraint for a respective vertex of the vertices,
   wherein the geometric computation module is configured to calculate a particular output vertex corresponding to the respective vertex, based on the particular preservation constraint.

6. The method of claim 1, wherein the geometric computation module includes an energy minimization module configured for:
   calculating a density-weighted quadratic attachment energy term.

7. The method of claim 1, wherein the target characteristics include one or more of a density geometric characteristic, an anisotropy geometric characteristic, or a sharpness geometric characteristic.

8. The method of claim 1, wherein:
   the CGDL source text includes a formal grammar that defines a mathematical operation of the instruction, and
   the geometric characteristic parsing modules are configured to identify the defined mathematical operation via interpretation of the formal grammar in the CGDL source text.

9. A system for generating remeshed three-dimensional ("3D") graphical surfaces, the system comprising:
   a compact geometric descriptive language ("CGDL") conversion module configured for:
   receiving an input mesh for a 3D graphical object, the input mesh comprising edges and vertices describing a surface of the 3D graphical object; and
   receiving CGDL source text that describes target characteristics of an output mesh of the 3D graphical object;
   a plurality of geometric characteristic parsing modules, each respective parsing module of the geometric characteristic parsing modules being configured for:
   identifying one or more inherent geometric characteristics of the input mesh;
   generating a respective geometric characteristic map describing a respective target characteristic, wherein the respective geometric characteristic map includes an instruction to generate the output mesh having the respective target characteristic, wherein the instruction describes a relationship of the one or more inherent geometric characteristics with the respective target characteristic; and
   providing, to a geometric computation module, the respective geometric characteristic map; and
   the geometric computation module, which is configured for generating the output mesh having the target characteristics.

10. The system of claim 9, wherein:
the plurality of geometric characteristic parsing modules includes a density parsing module, an anisotropy parsing module, and a sharpness parsing module, and
the target characteristics include a density geometric characteristic, an anisotropy geometric characteristic, and a sharpness geometric characteristic.

11. The system of claim 9, wherein the geometric computation module is further configured for:
calculating point locations in a coordinate space, wherein the point locations are based on the one or more inherent geometric characteristics of the input mesh;
calculating, based on the instruction, a target density of the point locations within the coordinate space; and
calculating, for each particular point location within the coordinate space, a scalar value indicating the target density at the particular point location.

12. The system of claim 9, wherein the geometric computation module is further configured for:
calculating point locations in a coordinate space, wherein the point locations are based on the one or more inherent geometric characteristics of the input mesh; and
calculating, based on the instruction and the point locations, a symmetric matrix space, wherein within the symmetric matrix space, a particular symmetric matrix for a respective point location of the point locations describes a local anisotropic scalar product.

13. The system of claim 9, wherein the geometric computation module is further configured for:
identifying, based on the instruction and for each of the vertices on the surface of the 3D graphical object, a particular preservation constraint for a respective vertex of the vertices,
wherein the geometric computation module is configured to calculate a particular output vertex corresponding to the respective vertex, based on the particular preservation constraint.

14. The system of claim 9, wherein the geometric computation module includes an energy minimization module configured for:
calculating a density-weighted quadratic attachment energy term.

15. The system of claim 9, wherein:
the CGDL source text includes a formal grammar that defines a mathematical operation of the instruction, and
each of the geometric characteristic parsing modules are configured to identify the defined mathematical operation via interpretation of the formal grammar in the CGDL source text.

16. A non-transitory computer-readable medium embodying program code for generating remeshed three-dimensional ("3D") graphical surfaces, wherein, when executed by a processor, the program code causes the processor to perform operations comprising:
receiving an input mesh for a 3D graphical object, the input mesh comprising edges and vertices describing a surface of the 3D graphical object;
receiving compact geometric descriptive language ("CGDL") source text that describes target characteristics of an output mesh of the 3D graphical object;
applying a plurality of geometric characteristic parsing modules to the CGDL source text by performing, by each respective parsing module in the plurality of geometric characteristic parsing modules:
(i) identifying one or more inherent geometric characteristics of the input mesh, and
(ii) generating a geometric characteristic map describing a respective target characteristic, wherein the geometric characteristic map includes an instruction to generate the output mesh having the respective target characteristic, wherein the instruction describes a relationship of the one or more inherent geometric characteristics with the respective target characteristic;
providing the geometric characteristic map to a geometric computation module; and
receiving, from the geometric computation module, the output mesh having the target characteristics.

17. The non-transitory computer-readable medium of claim 16, wherein the geometric computation module is further configured for:
calculating point locations in a coordinate space, wherein the point locations are based on the one or more inherent geometric characteristics of the input mesh;
calculating, based on the instruction, a target density of the point locations within the coordinate space; and
calculating, for each particular point location within the coordinate space, a scalar value indicating the target density at the particular point location.

18. The non-transitory computer-readable medium of claim 16, wherein the geometric computation module is further configured for:
calculating point locations in a coordinate space, wherein the point locations are based on the one or more inherent geometric characteristics of the input mesh; and
calculating, based on the instruction and the point locations, a symmetric matrix space, wherein within the symmetric matrix space, a particular symmetric matrix for a respective point location of the point locations describes a local anisotropic scalar product.

19. The non-transitory computer-readable medium of claim 16, wherein the geometric computation module is further configured for:
identifying, based on the instruction and for each of the vertices on the surface of the 3D graphical object, a particular preservation constraint for a respective vertex of the vertices,
wherein the geometric computation module is configured to calculate a particular output vertex corresponding to the respective vertex, based on the particular preservation constraint.

20. The non-transitory computer-readable medium of claim 16, wherein the geometric computation module includes an energy minimization module configured for:
calculating a density-weighted quadratic attachment energy term.

* * * * *